United States Patent
Nakama et al.

(10) Patent No.: US 10,222,559 B2
(45) Date of Patent: Mar. 5, 2019

(54) FERRULE AND METHOD OF MANUFACTURING OPTICAL-FIBER-ATTACHED FERRULE

(71) Applicant: FUJIKURA LTD., Tokyo (JP)

(72) Inventors: Akihiro Nakama, Chiba (JP); Shigeo Takahashi, Chiba (JP); Tatsuya Ota, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/560,852

(22) PCT Filed: Jan. 29, 2016

(86) PCT No.: PCT/JP2016/052676
§ 371 (c)(1),
(2) Date: Sep. 22, 2017

(87) PCT Pub. No.: WO2016/152246
PCT Pub. Date: Sep. 29, 2016

(65) Prior Publication Data
US 2018/0120516 A1    May 3, 2018

(30) Foreign Application Priority Data

Mar. 25, 2015  (JP) ................... 2015-062651
Nov. 18, 2015  (JP) ................... 2015-226033

(51) Int. Cl.
*G02B 6/38*     (2006.01)
*G02B 6/32*     (2006.01)
(Continued)

(52) U.S. Cl.
CPC ............. *G02B 6/3853* (2013.01); *G02B 6/32* (2013.01); *G02B 6/36* (2013.01); *G02B 6/3821* (2013.01);
(Continued)

(58) Field of Classification Search
CPC .......................... G02B 6/3867; G02B 6/3865
See application file for complete search history.

(56) References Cited

U.S. PATENT DOCUMENTS 6,799,900 B2    10/2004   Shiino et al.
9,063,304 B2     6/2015   Ohta et al.
(Continued)

FOREIGN PATENT DOCUMENTS

CN        102313938 A    1/2012
JP      2000-121868 A    4/2000
(Continued)

OTHER PUBLICATIONS

International Preliminary Report on Patentability for corresponding International Application No. PCT/JP2016/052676, dated Oct. 5, 2017 (11 pages).
(Continued)

*Primary Examiner* — Jerry Rahll
(74) *Attorney, Agent, or Firm* — Osha Liang LLP

(57) ABSTRACT

A ferrule holds end portions of optical fibers and includes: a plurality of optical fiber holes arranged in a predetermined direction, wherein the optical fibers are inserted into the plurality of optical fiber holes; and an adhesive-filling section that is filled with an adhesive and internally includes an opening surface of the plurality of optical fiber holes and an opposed surface opposed to the opening surface. The adhesive-filling section includes an upper side opening and a lower side opening, the upper side opening opens on a top surface that is a surface on a side from which the adhesive is filled, and the lower side opening opens on a lower surface that is a surface on a side opposite to the top surface.

16 Claims, 16 Drawing Sheets

(51) Int. Cl.
*G02B 6/36* (2006.01)
*G02B 6/44* (2006.01)

(52) U.S. Cl.
CPC ......... *G02B 6/3861* (2013.01); *G02B 6/3867* (2013.01); *G02B 6/3882* (2013.01); *G02B 6/3885* (2013.01); *G02B 6/3887* (2013.01); *G02B 6/4403* (2013.01)

(56) References Cited

U.S. PATENT DOCUMENTS

| | | |
|---|---|---|
| 2002/0168150 A1 | 11/2002 | Shiino et al. |
| 2009/0116793 A1* | 5/2009 | Nishimura ........... G02B 6/3885 385/78 |
| 2011/0317959 A1 | 12/2011 | Ohta et al. |
| 2012/0093462 A1 | 4/2012 | Childers et al. |
| 2014/0321814 A1 | 10/2014 | Chen et al. |
| 2015/0198771 A1 | 7/2015 | Nakama et al. |

FOREIGN PATENT DOCUMENTS

| | | |
|---|---|---|
| JP | 2002-333549 A | 11/2002 |
| JP | 2003-050336 A | 2/2003 |
| JP | 2012-013805 A | 1/2012 |
| JP | 2013-64846 A | 4/2013 |
| JP | 2014-85418 A | 5/2014 |
| JP | 5564344 B2 | 7/2014 |
| JP | 2014-521996 A | 8/2014 |

OTHER PUBLICATIONS

Office Action in counterpart Japanese Patent Application No. 2015-062651 dated Sep. 11, 2018 (7 pages).
Office Action in counterpart Japanese Patent Application No. 2015-226033 dated Mar. 14, 2017 (6 pages).
Office Action issued in corresponding Chinese Application No. 201680016514.3 dated Sep. 5, 2018 (16 pages).
Office Action issued in corresponding Japanese Patent Application No. 2015-062651 dated Jan. 8, 2019 (9 pages).

* cited by examiner

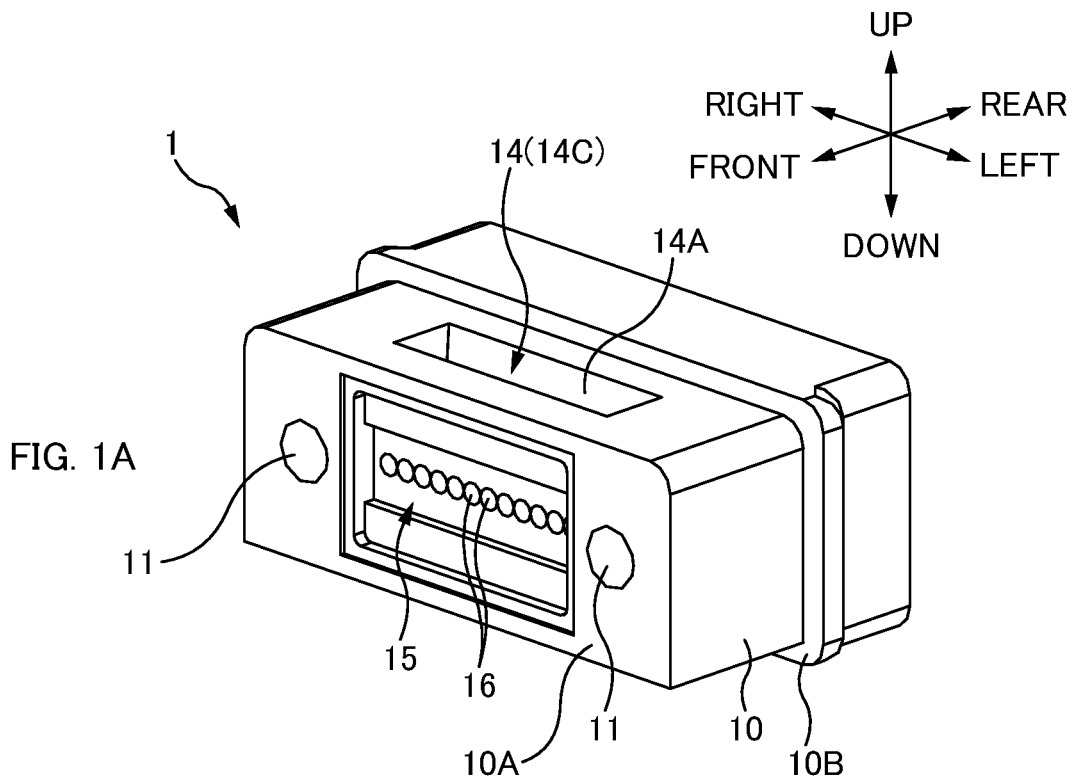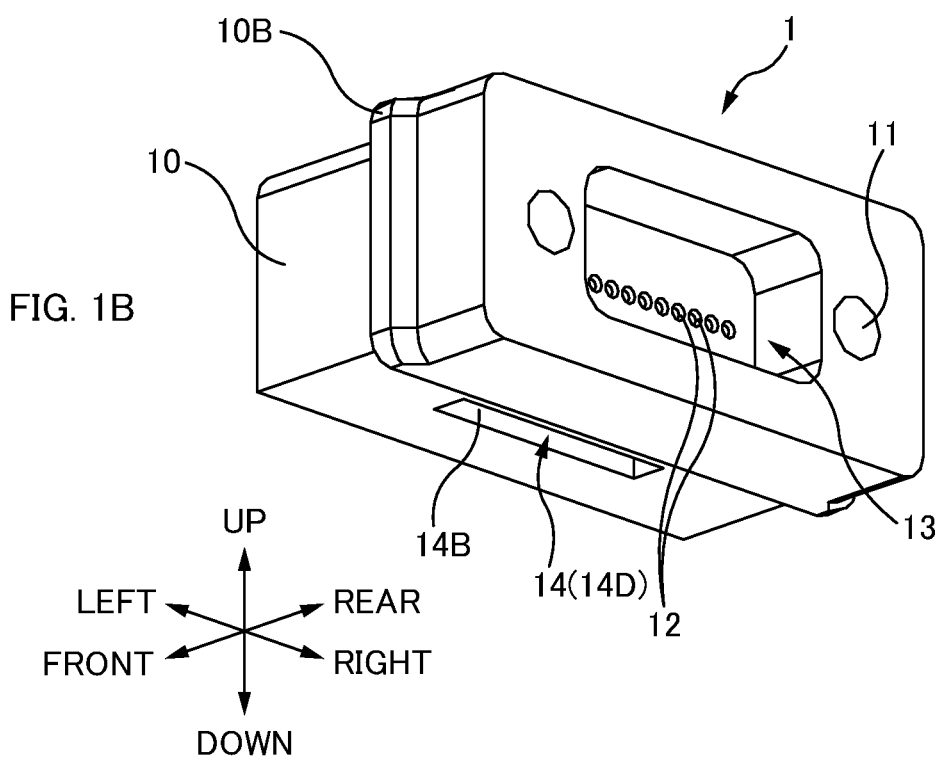

(COMPARATIVE
EXAMPLE)

(W > W1)

(MODIFICATION
W > 0.5 × W0)

FERRULE AND METHOD OF MANUFACTURING OPTICAL-FIBER-ATTACHED FERRULE

TECHNICAL FIELD

The present invention relates to a ferrule and a method of manufacturing an optical-fiber-attached ferrule.

BACKGROUND ART

As a ferrule to hold end portions of optical fibers, there has been known the following ferrule. The ferrule includes an adhesive-filling section having an opening from which an adhesive is filled. The adhesive is filled in the adhesive-filling section to fix the optical fibers. Patent Literature 1 discloses that an adhesive is filled and hardened in an adhesive-filling section while end surfaces of optical fibers are caused to abut onto an inner wall of the adhesive-filling section of a ferrule.

CITATION LIST

Patent Literature

Patent Literature 1: Japanese Patent No. 5564344

Conventionally, an adhesive-filling section is open only on one surface (for example, atop surface) of a ferrule. However, with such shape, when an adhesive expands and contracts under a high-temperature, high-humidity environment, for example, the ferrule deforms so as to warp. Consequently, end surfaces of fibers peel off from an inner wall of the adhesive-filling section, thus possibly increasing transmission loss.

SUMMARY someone or more embodiments of the present invention provide a ferrule that can reduce transmission loss even when an adhesive in an adhesive-filling section expands and contracts.

One or more embodiments of the present invention provide a ferrule that holds end portions of optical fibers, the ferrule including: a plurality of optical fiber holes arranged in a predetermined direction, the plurality of optical fiber holes being provided to insert the optical fibers; and an adhesive-filling section to be filled with an adhesive, the adhesive-filling section internally including an opening surface of the plurality of optical fiber holes and an opposed surface opposed to the opening surface, wherein the adhesive-filling section includes an upper side opening and a lower side opening, the upper side opening on a top surface that is a surface on a side from which the adhesive is filled, the lower side opening on a lower surface that is a surface on a side opposite to the top surface.

Other features will be made clear by the Description and Drawings described below.

With one or more embodiments of the present invention, even when an adhesive in an adhesive-filling section expands and contracts, transmission loss can be reduced.

BRIEF DESCRIPTION OF DRAWINGS

FIG. 1A and FIG. 1B are overall perspective views of a ferrule 1 of a first embodiment.

FIG. 16A is a top view, and FIG. 16B is a cross-sectional side view. FIG. 16C is a cross-sectional side view illustrating a state of filling the adhesive 5 in the comparative example.

DETAILED DESCRIPTION OF EMBODIMENTS

Figure 2:
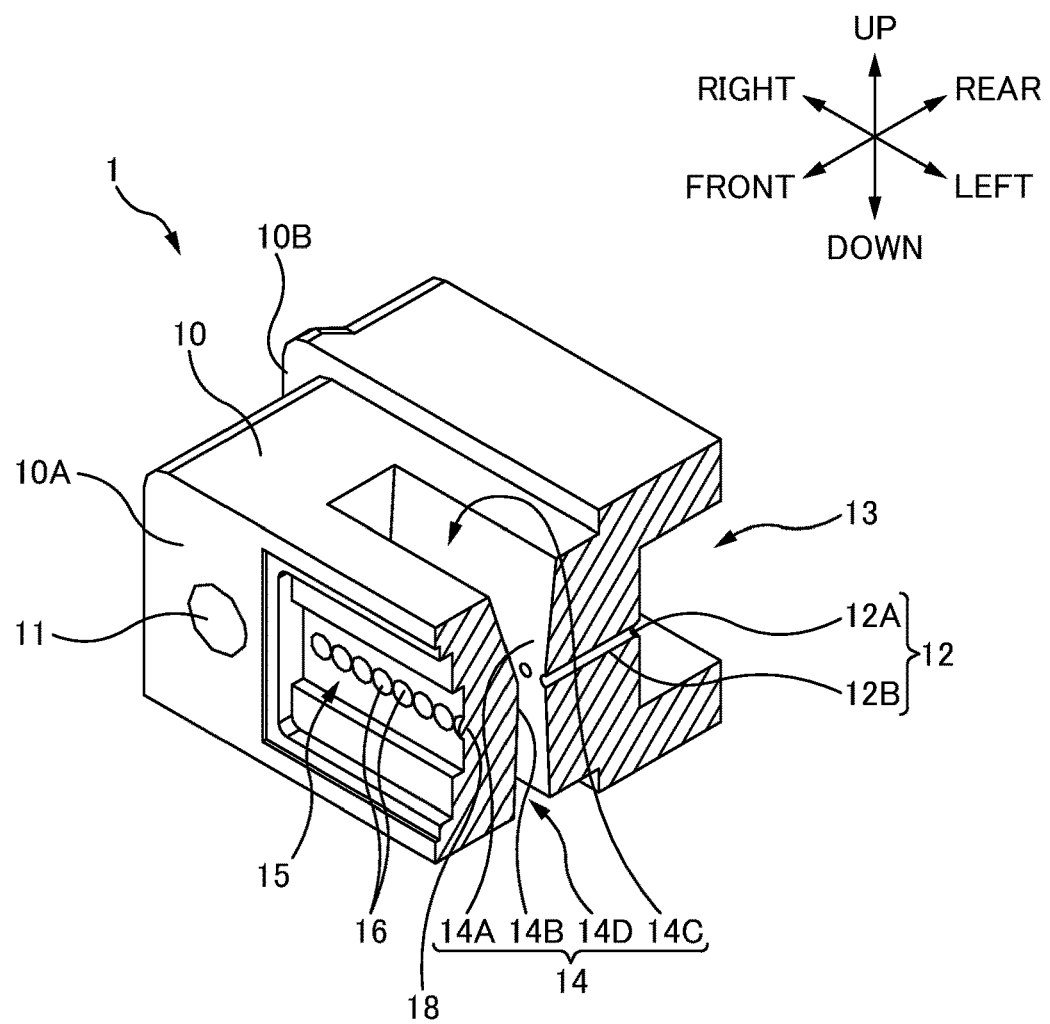
FIG. 2 is a cutaway perspective view of the ferrule 1 of the first embodiment.

At least the following matters will be made clear from the descriptions of Description and Drawings below.

The following ferrule will become apparent. A ferrule that holds end portions of optical fibers, the ferrule including: a plurality of optical fiber holes arranged in a predetermined direction, the plurality of optical fiber holes being provided to insert the optical fibers; and an adhesive-filling section to be filled with an adhesive, the adhesive-filling section internally including an opening surface of the plurality of optical fiber holes and an opposed surface opposed to the opening surface, wherein the adhesive-filling section includes an upper side opening and a lower side opening, the upper side opening on a top surface that is a surface on a side from which the adhesive is filled, the lower side opening opening on a lower surface that is a surface on a side opposite to the top surface. Since a bottom wall of the ferrule is not disposed at the lower side opening, a deformation so as to warp the ferrule can be reduced. Since the deformation so as to warp the ferrule can be reduced, the optical fiber end surfaces are less likely to peel off from the opposed surface, thereby ensuring reducing transmission loss of an optical signal.

The upper side opening preferably has a length W0 in the predetermined direction wider than a length W1, the length W1 being a length of a row of a plurality of the optical fiber holes in the predetermined direction, and the lower side opening preferably has a length W in the predetermined direction wider than a half of the length W0 of the upper side opening. This allows making an amount of deformation of the ferrule at the lower side opening close to an amount of deformation of the ferrule at the upper side opening, thus ensuring reducing the deformation so as to warp the ferrule.

The lower side opening preferably has the length W wider than the length W1 of the row of the plurality of the optical fiber holes. This allows further reducing of the deformation of the ferrule.

A size of the lower side opening is preferably such that the adhesive does not pass through due to surface tension of the adhesive. This ensures preventing the adhesive from leaking from the lower side opening.

The upper side opening is preferably formed into a tapered shape expanding to an upper side. This facilitates the filling of the adhesive.

The ferrule preferably includes a recess site and lens sections. The recess site is recessed with respect to an end surface of the ferrule. The lens sections are formed on the recess site. The lens sections are disposed corresponding to the respective optical fiber holes. This eliminates a physical coupling between the mutual optical fiber end surfaces, ensuring enhancing of durability.

The following method of manufacturing an optical-fiber-attached ferrule is apparent. A method of manufacturing an optical-fiber-attached ferrule including: (1) preparing a ferrule that includes a plurality of optical fiber holes arranged in a predetermined direction, the plurality of optical fiber holes being provided to insert optical fibers, and an adhesive-filling section to be filled with an adhesive, the adhesive-filling section internally including an opening surface of the plurality of optical fiber holes and an opposed surface opposed to the opening surface, the adhesive-filling section having an upper side opening and a lower side opening, the upper side opening on a top surface that is a surface on a side from which the adhesive is filled, the lower side opening on a lower surface that is a surface on a side opposite to the top surface; (2) causing end surfaces of the optical fibers protruding from the opening surface to abut onto the opposed surface by inserting the optical fibers into the optical fiber holes; and (3) filling the adhesive between the end surfaces of the optical fibers and the opposed surface by filling the adhesive in the adhesive-filling section. Since the deformation so as to warp the ferrule can be reduced, the optical fiber end surfaces are less likely to peel off from the opposed surface, thus ensuring reducing transmission loss of an optical signal.

The adhesive preferably fills between the end surfaces of the optical fibers and the opposed surface by the filling of the adhesive from the upper side opening. This eases the work of filling of the adhesive.

Depending on the dimension of the adhesive-filling section (the opening) and due to the viscosity of the adhesive, it is difficult for the adhesive to reach lower sides of the optical fibers and air possibly remains (air bubble is generated) at the lower sides of the optical fibers. Especially, in the case where the plurality of optical fibers are arranged inside the adhesive-filling section, the air is likely to remain.

Therefore, one or more embodiments of this invention can avoid air from remaining inside the adhesive-filling section.

At least the following matters will be made clear from the descriptions of Description and Drawings below.

The following ferrule becomes apparent. The ferrule holds end portions of optical fibers. The ferrule has a ferrule end surface, optical fiber holes into which the optical fibers are to be inserted, an adhesive-filling section including an opening from which an adhesive is filled, the adhesive-filling section internally including an opening surface for the optical fiber holes and an opposed surface opposed to the opening surface, and a ventilation hole formed between an inside of the adhesive-filling section and an outside of the ferrule.

Such ferrule emits the air inside the adhesive-filling section from the ventilation hole during the filling of the adhesive. This allows avoiding the air from remaining inside the adhesive-filling section. This also allows preventing the air bubble from being generated at the optical fiber end surfaces and allows reducing the signal loss of the optical signal.

An opening of the ventilation hole to the adhesive-filling section side is preferably closer to a bottom surface of the adhesive-filling section than the optical fiber holes. This facilitates emitting the air inside the adhesive-filling section.

An opening of the ventilation hole to a side outside the ferrule may be formed on a side opposite to the opening from which the adhesive is filled.

A size of the ventilation hole is preferably such that the adhesive does not pass through due to surface tension of the adhesive. This allows emitting of only the air.

An opening of the ventilation hole to aside outside the ferrule may be formed on a side of the opening from which the adhesive is filled. Accordingly, the adhesive is less likely to flow out from the ventilation hole to the outside.

The ferrule may include a recess site recessed with respect to an end surface of the ferrule; and lens sections formed on the recess site, the lens sections being disposed corresponding to the respective optical fiber holes. In this case, since the recess site and the lens sections are provided, the adhesive-filling section becomes narrow, making the ventilation hole especially effective.

The ferrule may include a light transmitting part configured to transmit an optical signal between the end surface of the ferrule and the opposed surface, wherein the light transmitting part includes a reflective section configured to reflect the optical signal to convert an optical path.

The optical fiber hole may be plurally formed. Insertion of a plurality of the optical fibers into the respective optical fiber holes aligns the optical fibers protruding from the opening surface inside the adhesive-filling section. In this case, since the adhesive is likely to accumulate on upper portions of the plurality of optical fibers, the ventilation hole is especially effective.

The following method of manufacturing an optical-fiber-attached ferrule is apparent. A method of manufacturing the optical-fiber-attached ferrule including (1) preparing a ferrule that has a ferrule end surface, optical fiber holes provided to insert the optical fibers, an adhesive-filling section including an opening from which an adhesive is to be filled, the adhesive-filling section internally including an opening surface of the optical fiber holes and an opposed surface opposed to the opening surface, and a ventilation hole formed between an inside of the adhesive-filling section and an outside of the ferrule, (2) causing end surfaces of the optical fibers protruding from the opening surface to abut onto the opposed surface by inserting the optical fibers into the optical fiber holes, and (3) filling the adhesive in the adhesive-filling section.

First Embodiment

<Configuration>

Figure 3:
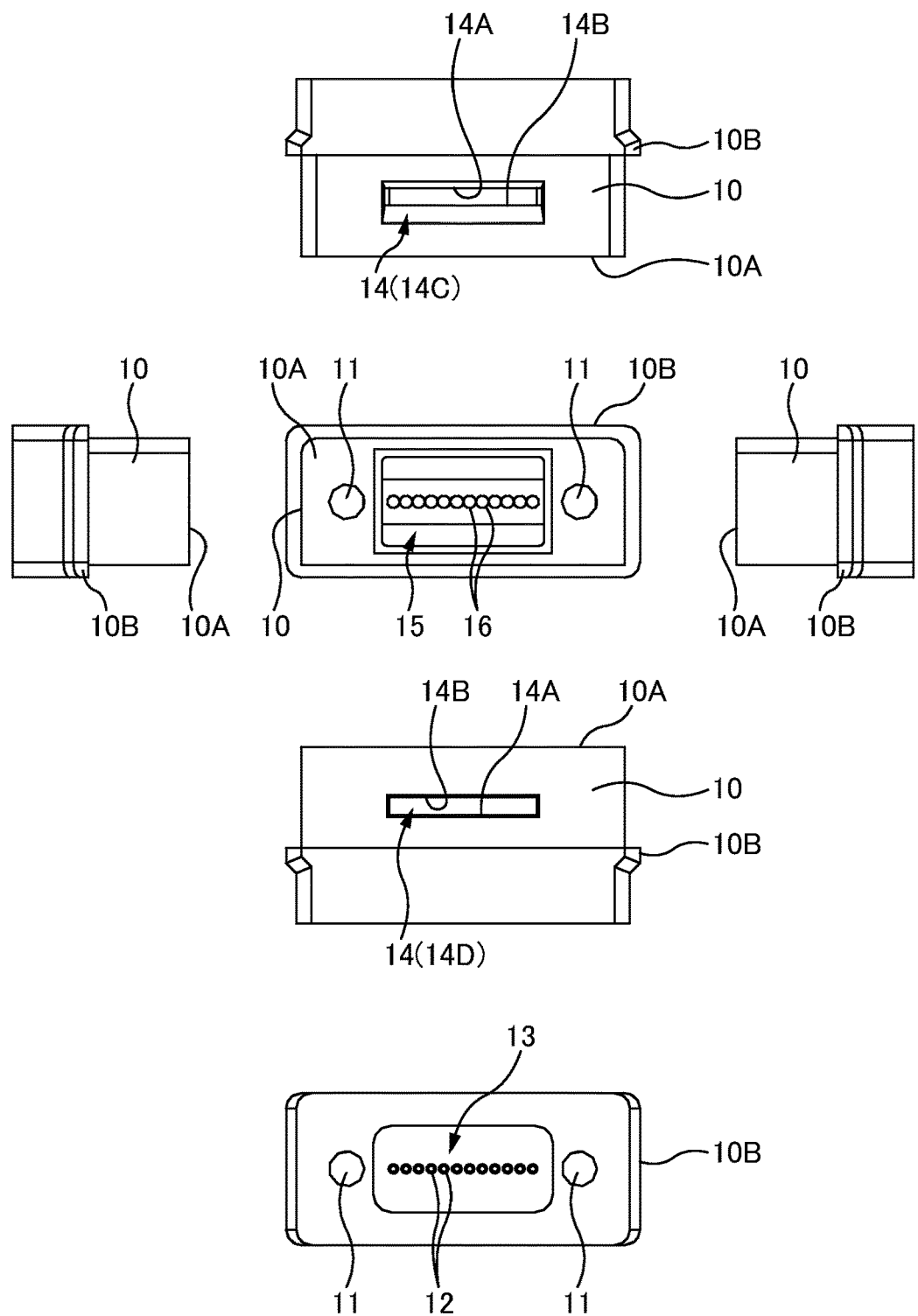
FIG. 3 is a drawing illustrating six surfaces of the ferrule 1 of the first embodiment.

FIG. 1A and FIG. 1B are overall perspective views of a ferrule 1 of a first embodiment. FIG. 2 is a cutaway perspective view of the ferrule 1 of the first embodiment. FIG. 3 is a drawing illustrating six surfaces of the ferrule 1 of the first embodiment.

The following description defines respective directions as illustrated in the drawings. That is, the direction of an optical fiber hole 12 is defined as a "front-rear direction". A coupling end surface 10A side of the ferrule 1 is defined as the "front" and the other side as the "rear." The thickness direction of the ferrule 1 is defined as an "up-down direction" and a side of an opening from which an adhesive is filled in an adhesive-filling section 14 is defined as the "up" and the other side as the "down." A direction perpendicular to the front-rear direction and the up-down direction is defined as the "right-left direction." A width direction of the ferrule 1 is defined as the "right-left direction." A direction that two guide pin holes 11 are arranged is defined as the "right-left direction." A direction that the plurality of optical fiber holes 12 are arranged is defined as the "right-left direction." That is, a direction that a plurality of optical fibers 3 constituting optical fiber ribbon (see reference numeral 4 in FIG. 7) mounted to the ferrule 1 are arranged is defined as the "right-left direction." In this right-left direction, the right side when the front is viewed from the rear is defined as the "right" and the other side as the "left."

First, the following describes differences between the ferrule 1 of the first embodiment and an ordinary MT ferrule (an optical connector specified by JIS C5981).

In the ordinary MT ferrule, optical fiber end surfaces are exposed from an end surface of the ferrule. The end surfaces of the ferrules are caused to abut onto one another to physically couple the optical fiber end surfaces, thus optically coupling the mutual optical fibers.

In contrast to this, the optical fiber end surfaces are not exposed from the ferrule end surface 10A of the ferrule 1 of the first embodiment. With the ferrule 1 of the first embodiment, lens sections 16 are disposed at a recess site 15 of the ferrule end surface 10A, and an optical signal is input to/output from the lens sections 16. That is, the ferrule 1 of this embodiment has no physical contact between the optical fiber end surfaces. This features high durability, not causing deterioration even when the attachment and removal are repeatedly performed.

The ferrule 1 is a member to hold the end portions of the optical fibers 3 (see FIG. 4B) to transmit the optical signals. The end surface 10A (the ferrule end surface 10A) on the front side of a body portion 10 of the ferrule 1 is a coupling end surface coupled to a ferrule on the other side. A flange part 10B, which protrudes outside from the outer peripheral surface of the body portion 10, is formed on the rear side of the body portion 10. The body portion 10 including the ferrule end surface 10A and the flange part 10B are integrally molded with a resin (for example, a transparent resin) that can transmit the optical signals. The end portions of the plurality of optical fibers 3 are held at the inside of this body portion 10. The dimension of the ferrule 1 of this embodiment in the front-rear direction is about 3.5 mm to 5.0 mm, which is shorter than the ordinary MT ferrule (about 8 mm).

The body portion 10 includes the guide pin holes 11, the optical fiber holes 12, a boot hole 13, the adhesive-filling section 14, the recess site 15, the lens sections 16, and a light transmitting part 18.

The guide pin hole 11 is a hole through which a guide pin (see reference numeral 22 in FIG. 7) is inserted. Inserting the guide pins into the guide pin holes 11 matches the positions of the mutual ferrules 1. The guide pin holes 11 penetrate the body portion 10 in the front-rear direction. On the ferrule end surface 10A, two guide pin holes 11 are open. The two guide pin holes 11 are formed spaced in the right-left direction so as to sandwich the plurality of optical fiber holes 12 from the right and left. The boot hole 13, the recess site 15, the lens sections 16, and the light transmitting part 18 are also disposed between the two guide pin holes 11 in addition to the optical fiber holes 12.

The optical fiber holes 12 are holes through which the optical fibers 3 are to be inserted. The optical fiber hole 12 is a hole to position the optical fiber 3. The optical fiber holes 12 penetrate between the boot hole 13 and the adhesive-filling section 14. A bare fiber formed by removing a coat from an optical fiber is to be inserted into the optical fiber hole 12. The optical fiber holes 12 are parallel to the front-rear direction, and the plurality of optical fiber holes 12 are arranged in the right-left direction. That is, the plurality of optical fiber holes 12 parallel to one another are arranged in the right-left direction. The optical fiber holes 12 each include a tapered part 12A and a fiber fixing part 12B.

The tapered part 12A is disposed at the rear end part of the optical fiber hole 12 and has a tapered shape expanding to the rear side. Disposing such tapered part 12A facilities inserting the optical fiber 3 into the optical fiber hole 12.

The fiber fixing part 12B is disposed to the front side with respect to the tapered part 12A and has a size (a diameter) approximately identical to the diameter of the optical fiber 3. This ensures positioning the optical fiber 3 inserted into the optical fiber hole 12.

The boot hole 13 is disposed on the end surface on the rear side of the ferrule 1. The boot hole 13 is a hole to house and fix a boot (see reference numeral 26 in FIG. 7) mounted to the optical fibers 3.

The adhesive-filling section 14 is a hollow portion in which the adhesive is filled. The adhesive-filling section 14 forms a hollow which is long in the right-left direction (longer than a length that the plurality of optical fiber holes 12 and lens sections 16 are arranged in the right-left direction). The adhesive-filling section 14 has an optical fiber hole opening surface 14A and an abutting surface 14B. The optical fiber hole opening surface 14A is the inner wall on the rear side of the adhesive-filling section 14. On the optical fiber hole opening surface 14A, the plurality of optical fiber holes 12 are open and arranged in the right-left direction. The abutting surface 14B is the inner wall on the front side of the adhesive-filling section 14 and is an opposed surface opposed to the optical fiber hole opening surface 14A. The abutting surface 14B is opposed to the openings of the optical fiber holes 12 on the optical fiber hole opening surface 14A and is a surface onto which the end surfaces of the optical fibers 3 abut.

The adhesive-filling section 14 of this embodiment penetrates the ferrule 1 in the up-down direction and has an upper side opening 14C and a lower side opening 14D.

The upper side opening 14C is a site opening to the top surface of the body portion 10 of the ferrule 1. The upper side opening 14C opens so as to have a rectangular shape elongated in the right-left direction at the top surface of the body portion 10 of the ferrule 1. The upper side opening 14C is an opening long in the right-left direction (longer than the length that the plurality of optical fiber holes 12 and lens sections 16 are arranged in the right-left direction). The adhesive is to be filled from this upper side opening 14C. For ease of filling of the adhesive, the upper side opening 14C is formed into a tapered shape expanding to the upper side in the front-rear direction. Note that, the upper side opening 14C needs not be formed into the tapered shape. The upper side opening 14C is sometimes referred to as the upper opening 14C.

The lower side opening 14D is a site opening to the lower surface of the body portion 10 of the ferrule 1. The lower side opening 14D opens so as to have a rectangular shape elongated in the right-left direction in the lower surface of the body portion 10 of the ferrule 1. The lower side opening 14D will be described later.

The recess site 15 is a site recessed to the ferrule end surface 10A. The recess site 15 is disposed between the two guide pin holes 11 on the ferrule end surface 10A. The recess site 15 is formed into a rectangular shape elongated in the right-left direction so as to correspond to the plurality of optical fiber holes 12.

The lens sections 16 are disposed on the bottom surface (the surface to the rear side) of the recess site 15. The lens sections 16 are disposed corresponding to the plurality of respective optical fibers 3 (in other words, the plurality of optical fiber holes 12). The optical signal is input to and output from the optical fibers 3 via the lens sections 16. The lens section 16 is, for example, formed to function as a collimating lens. Inputting and outputting the optical signal whose diameter has been enlarged with the lens section 16 ensures reducing an influence from such as dust in an optical path, thereby ensuring reducing the transmission loss of the optical signal.

The light transmitting part 18 is a site (a site forming the optical path) that transmits the optical signals between the ferrule end surface 10A (in detail, the lens sections 16 at the recess site 15 of the ferrule end surface 10A) and the abutting surface 14B of the adhesive-filling section 14. The body portion 10 of this embodiment is integrally molded with the resin that transmits the optical signals. Meanwhile, it is only necessary that at least the site (the light transmitting part 18) where the optical path is formed can transmit the optical signals, and a site other than this site may be made of another material (a material that does not transmit the optical signals).

<Lower Side Opening 14D>

Figure 4A:
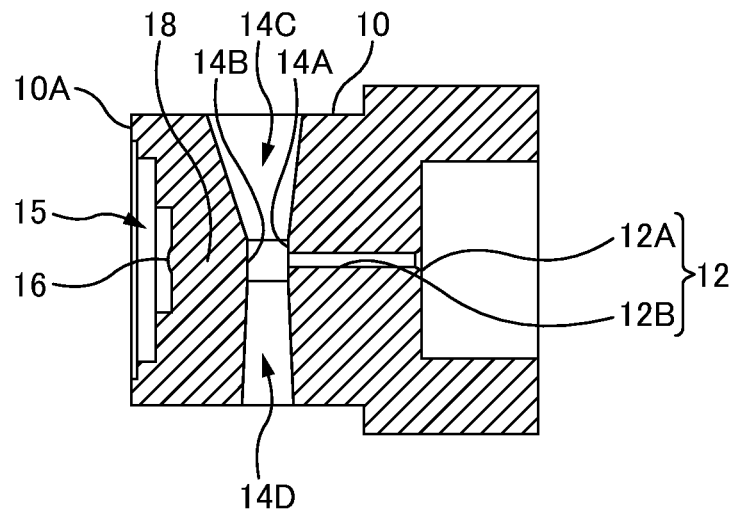
FIG. 4A is a cross-sectional view of the ferrule 1 of the first embodiment.
Figure 4B:
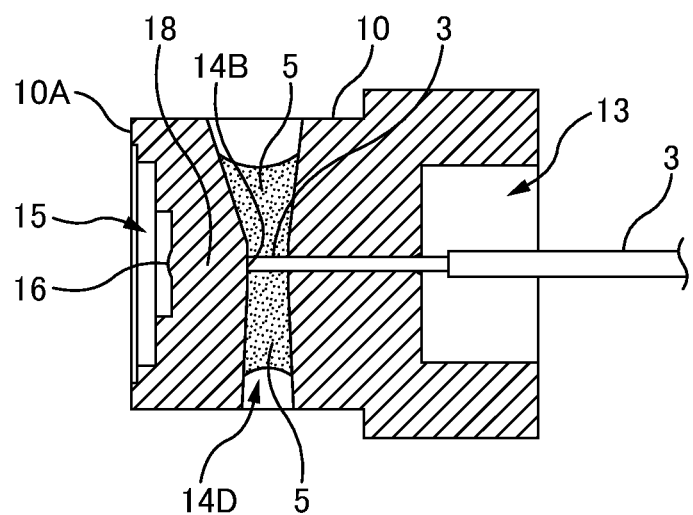
FIG. 4B is a cross-sectional view when an adhesive 5 is filled with optical fibers mounted to the ferrule 1 of the first embodiment and is a cross-sectional view of the optical-fiber-attached ferrule 1.
Figure 4C:
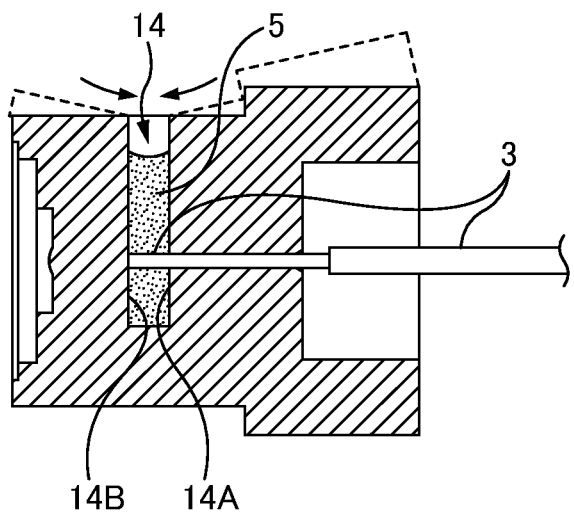
FIG. 4C is a cross-sectional view of a comparative example.

FIG. 4C is a cross-sectional view of a comparative example. With the comparative example, the lower side opening 14D is not disposed and the bottom of the adhesive-filling section 14 is closed. With the adhesive-filling section 14 opening only on the upper side like the comparative example, when the adhesive 5 filled in the adhesive-filling section 14 contracts, the ferrule 1 deforms such that the optical fiber hole opening surface 14A becomes close to the abutting surface 14B to the upper side of the ferrule 1 which is open. However, since the ferrule 1 has the bottom wall, the ferrule 1 does not deform on the lower side of the ferrule 1. Consequently, as indicated by the dotted line in FIG. 4C, the ferrule 1 deforms so as to warp. A cause of contraction of the adhesive 5 includes, for example, a high temperature, high humidity environment and the hardening of the adhesive 5.

Further, as indicated by the dotted line in FIG. 4C, when the ferrule 1 deforms so as to warp, the end surfaces of the optical fibers 3 peel off from the abutting surface 14B of the adhesive-filling section 14, possibly resulting in increase in transmission loss. The ordinary MT ferrule (the optical connector specified by JIS C5981) has the optical fiber end surfaces exposed from the ferrule end surfaces. In the MT ferrule, the optical fiber end surfaces are not caused to abut onto the inner wall (the abutting surface 14B) of the adhesive-filling section 14 like this embodiment. Therefore, supposing that, when the adhesive in the adhesive-filling section contracts and causes the ferrule to deform so as to warp, this embodiment does not cause peeling off between the optical fiber end surfaces and the abutting surface 14B. In view of this, peeling of the optical fiber end surfaces is prone to occur to the structure like the comparative example and this embodiment where the optical fiber end surfaces are caused to abut onto the inner wall of the adhesive-filling section 14 (the abutting surface 14B).

FIG. 4A is a cross-sectional view of the ferrule 1 of the first embodiment. FIG. 4B is a cross-sectional view when the adhesive 5 is filled with the optical fibers 3 mounted to the ferrule 1 of the first embodiment. In other words, FIG. 4B is a cross-sectional view of the optical-fiber-attached ferrule 1.

The adhesive-filling section 14 of this embodiment penetrates the ferrule 1 in the up-down direction and has the upper side opening 14C and the lower side opening 14D. With this embodiment, the lower side opening 14D opens in the lower surface of the ferrule 1, and the bottom wall of the ferrule 1 is not disposed at the lower side opening 14D. In view of this, with this embodiment, when the ferrule 1 deforms such that the optical fiber hole opening surface 14A comes close to the abutting surface 14B on the upper side opening 14C by a contractile force of the adhesive 5, the ferrule 1 is also deformable in the lower side opening 14D such that the optical fiber hole opening surface 14A comes close to the abutting surface 14B. Accordingly, with this embodiment, supposing that the adhesive 5 in the adhesive-filling section 14 contracts, since the contractile force by the adhesive 5 acts on both the upper portion and the lower portion of the ferrule 1, the deformation so as to warp the ferrule 1 can be reduced. With this embodiment, the deformation so as to warp the ferrule 1 can be reduced. Accordingly, the optical fiber end surfaces are less likely to peel off from the abutting surface 14B, ensuring reducing the transmission loss of the optical signal.

Figure 5A:
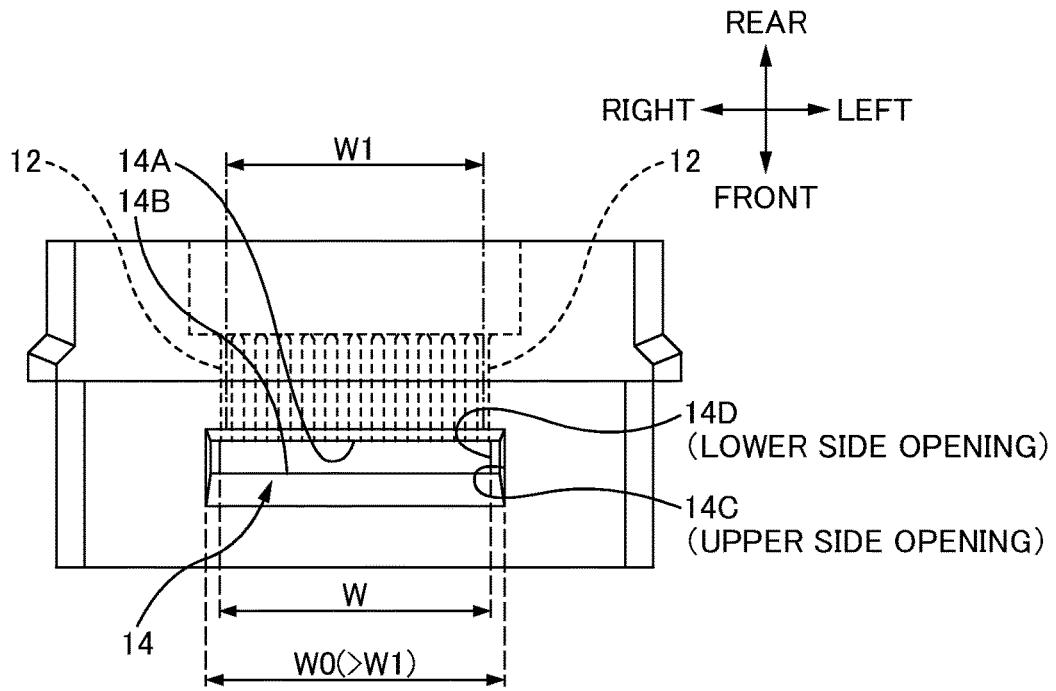
FIG. 5A is a drawing viewing the ferrule 1 of the first embodiment from an upper side.

FIG. 5A is a drawing viewing the ferrule 1 of the first embodiment from the upper side. A length W0 of the upper side opening 14C in the right-left direction (an interval between a left inner wall and a right inner wall of the upper side opening 14C) is wider than an interval W1 between the optical fiber hole 12 on the left end and the optical fiber hole 12 on the right end in the right-left direction (hereinafter referred to as a fiber hole row width W1). This is in order to apply the adhesive 5 to the plurality of respective optical fibers 3 (the plurality of optical fibers 3 constituting the optical fiber ribbon) inserted into the plurality of optical fiber holes 12 (the optical fiber hole row) arranged in the right-left direction.

With this embodiment, the length W of the lower side opening 14D in the right-left direction (an interval between a left inner wall and a right inner wall of the lower side opening 14D) is configured wider than the optical fiber hole row width W1 (W>W1). Accordingly, when the adhesive 5 filled in the adhesive-filling section 14 contracts, the respective optical fibers 3 contract on both the upper portions and the lower portions. Accordingly, the contractile force by the adhesive 5 affects the ferrule 1 on both sides of the upper portions and the lower portions of the respective optical fibers 3. Therefore, the fiber end surface is less likely to peel off from the abutting surface 14B due to the deformation of the ferrule 1.

Figure 5B:
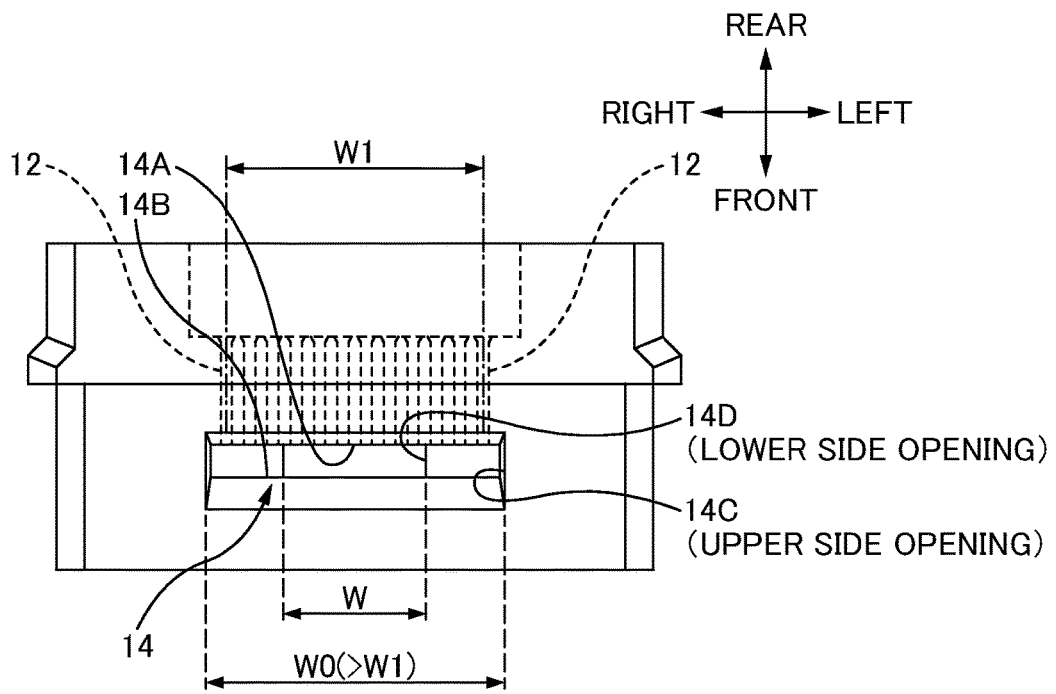
FIG. 5B is a drawing viewing a ferrule 1 of a modification of the first embodiment from an upper side.

The deformation so as to warp the ferrule 1 can be reduced by making an amount of approach (an amount of deformation) of the optical fiber hole opening surface 14A to the abutting surface 14B in the lower side opening 14D close to an amount of approach (an amount of deformation) of the optical fiber hole opening surface 14A to the abutting surface 14B in the upper side opening 14C. In view of this, the lower side opening 14D is preferably long in the right-left direction when viewed from above (or from below). As illustrated in FIG. 5B, the length W of the lower side opening 14D in the right-left direction is preferably wider than a half of the length W0 of the upper side opening 14C in the right-left direction (W>0.5×W0). Accordingly, as illustrated in FIG. 5B, it is acceptable for the length W of the lower side opening 14D in the right-left direction to be narrower than the optical fiber hole row width W1. Note that, as illustrated in FIG. 5A, with the length W of the lower side opening 14D in the right-left direction wider than the optical fiber hole row width W1 ensures reducing the deformation of the ferrule 1.

<Method of Manufacturing Fiber-Attached Ferrule 1>

Figure 6:
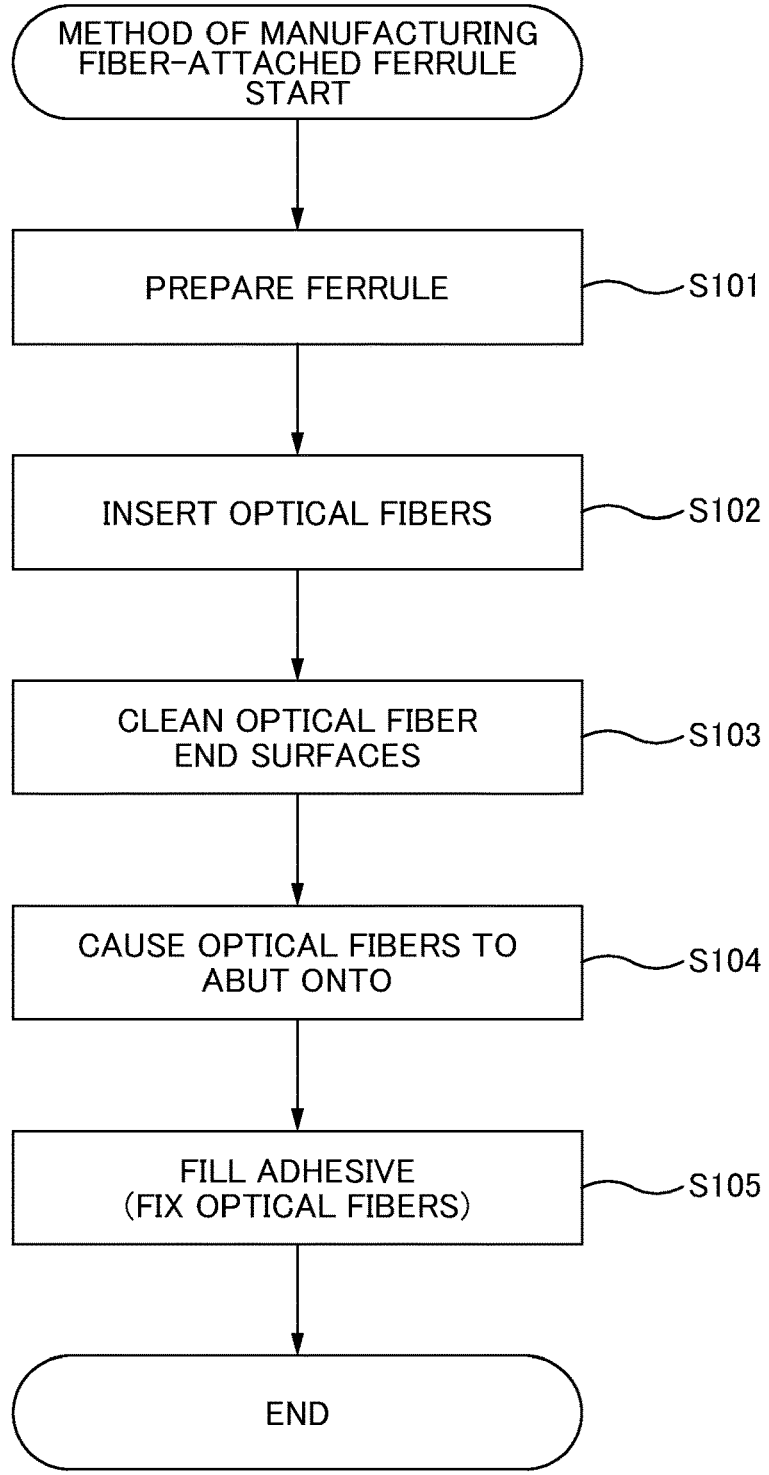
FIG. 6 is a flowchart of a manufacturing method (an assembly procedure) of the fiber-attached ferrule 1.

FIG. 6 is a flowchart of the manufacturing method (the assembly procedure) of the fiber-attached ferrule 1.

First, an operator prepares the ferrule 1 of this embodiment (S101). The operator inserts each of the optical fibers 3 of the optical fiber ribbon into each of the optical fiber holes 12 on the ferrule 1 (S102). Then, the optical fiber end surfaces are made to protrude from the optical fiber hole opening surface 14A. Note that, at this phase, the optical fiber end surfaces do not abut onto the abutting surface 14B of the adhesive-filling section 14. This is because, when the optical fibers 3 are passed through the optical fiber holes 12, dust and the like possibly attach to the optical fiber end surfaces.

Next, the operator cleans the optical fiber end surfaces protruding from the optical fiber hole opening surface 14A of the adhesive-filling section 14 (S103). This allows removing the dust on the optical fiber end surfaces attached during the insertion to the optical fiber holes 12. To thus remove the dust on the optical fiber end surfaces, the adhesive 5 is filled after the insertion of the optical fibers 3.

After cleaning the optical fiber end surfaces, the operator causes the optical fiber end surfaces to abut onto the abutting surface 14B of the adhesive-filling section 14 (S104). At this phase, an air layer is present between the optical fiber end surface and the abutting surface 14B.

Next, the operator fills the adhesive 5 from the upper side opening 14C into the adhesive-filling section 14 to fix the optical fibers 3 (S105). The adhesive 5 to be filled at this time is the adhesive 5 also functioning as a refractive index-matching material. Filling the adhesive 5 (the refractive index-matching material) between the optical fiber end surfaces and the abutting surface 14B reduces the transmission loss of the optical signal. When the air layer is supposedly formed on the optical fiber end surfaces the transmission loss of the optical signal increases, and the adhesive 5 (the refractive index-matching material) is filled between the optical fiber end surfaces and the abutting surface 14B by capillarity of the adhesive 5, which is a liquid during the filling.

With the plurality of end surfaces of the optical fibers 3 abutted onto the abutting surface 14B, the plurality of optical fibers 3 become a barrier at the inside of the adhesive-filling section 14. Accordingly, the adhesive 5 is likely to accumulate on the upper portions of the plurality of optical fibers 3, possibly resulting in blocking the adhesive-filling section 14 with the adhesive 5 accumulated on the upper portions of the plurality of optical fibers 3. Note that, with this embodiment, even when the adhesive 5 blocks the upper side opening 14C during the filling, ventilation is possible from the lower side opening 14D; thus, the adhesive 5 accumulated on the upper portions of the plurality of optical fibers 3 is likely to flow to the lower portions of the optical fibers 3. Note that, like the ferrule 1 of the comparative example illustrated in FIG. 4C, with the ferrule 1 having no opening on the lower side of the adhesive-filling section 14, in the case where the upper portions of the optical fibers 3 are once blocked with the adhesive 5, it is difficult for the adhesive 5 to reach the lower side of the adhesive-filling section 14, and the air bubbles are likely to form on the lower side of the adhesive-filling section 14 and the optical fiber end surfaces.

Even when the air bubble is formed while filling the adhesive 5 in the adhesive-filling section 14, the air bubble may come out after a sufficient time has elapsed. However, this takes time until the air bubble comes out, resulting in poor work efficiency. In contrast to this, this embodiment can escape the air to the outside with the lower side opening 14D. Additionally, this embodiment has a structure in which the air bubble is less likely to be formed, thus causing an effect of ensuring shortening the working time taken for filling the adhesive-filling section 14 with the adhesive 5.

With this embodiment, filling the adhesive 5 from the upper side opening 14C causes the adhesive 5 to reach the lower portions of the optical fibers 3 as well. In view of this, it is only necessary to fill the adhesive-filling section 14 with the adhesive 5 from the one side; thus, compared with the case of filling of the adhesive 5 from both upper and lower sides, the work for filling the adhesive 5 is easy. Supposing that the adhesive 5 is filled from both upper and lower sides, the air bubble is likely to be formed inside the adhesive-filling section 14, and in this embodiment the adhesive-filling section 14 is filled with the adhesive 5 from one side, thus ensuring reducing of generation of the air bubble.

With this embodiment, due to surface tension of the adhesive 5, the leakage of the adhesive 5 from the opening of the lower side opening 14D to the lower side is prevented. In other words, the size of the lower side opening 14D of this embodiment is such that the adhesive 5 does not leak to the lower side of the lower side opening 14D due to the surface tension of the adhesive 5. The dimension of the adhesive-filling section 14 in the front-rear direction (the interval between the optical fiber hole opening surface 14A and the abutting surface 14B, the dimension of the lower side opening 14D in the front-rear direction) is about 0.35 mm. Viscosity of the adhesive 5 is in a range of several 100 mPa·second to 4000 mPa·second.

After filling the adhesive 5 in the adhesive-filling section 14, the operator heats the adhesive 5 to harden the adhesive 5 and fix the optical fibers 3. Using an ultraviolet cured resin as the adhesive 5, the adhesive 5 may be hardened through irradiation of ultraviolet rays.

The above-described method of manufacturing the fiber-attached ferrule 1 allows the filling of the adhesive 5 between the end surfaces of the optical fibers 3 and the abutting surface 14B. Additionally, since the bottom wall of the ferrule 1 is not disposed in the lower side opening 14D, the deformation so as to warp the ferrule 1 can be reduced. Since the deformation so as to warp the ferrule 1 can be reduced, the optical fiber end surfaces are less likely to peel off from the abutting surface 14B, thus ensuring reducing the transmission loss of the optical signal.

<Optical Connector>

Figure 7:
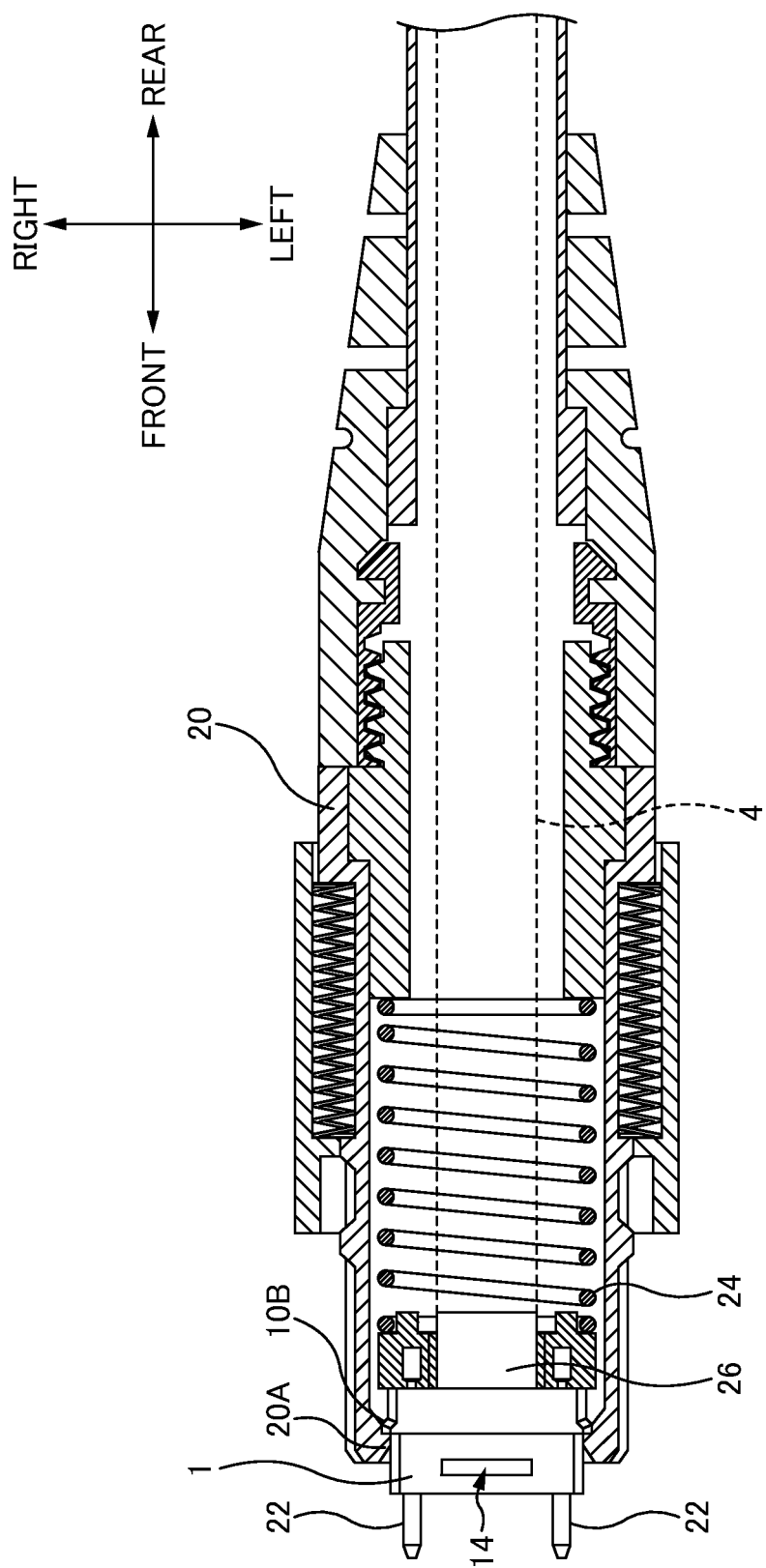
FIG. 7 is a schematic cross-sectional view of an optical connector using the ferrule 1 of the first embodiment.

FIG. 7 is a schematic cross-sectional view of an optical connector using the ferrule 1 of the first embodiment. As illustrated in the drawing, the ferrule 1 of this embodiment can be housed in a housing 20 of the optical connector and uses.

The housing 20 is a member that houses the ferrule 1 to be retreatable. A protruding part 20A is formed at an internal space of the housing 20. With this protruding part 20A engaged with the flange part 10B of the ferrule 1, the ferrule 1 is biased to the front side by a repulsion force from a spring 24.

The guide pins 22 are inserted into the two guide pin holes 11 of the ferrule 1. These guide pins 22 position the ferrule 1 with respect to a ferrule 1 of the optical connector on the other side. The boot 26 is inserted into the boot hole 13 of the ferrule 1. The boot 26 is a member whose cross-sectional surface has an approximately tubular rectangular shape. The plurality of respective optical fibers 3 of the optical fiber ribbon 4 penetrate the boot 26 in the front-rear direction. The dimensions of the boot 26 in the right-left direction and the up-down direction are approximately identical to the dimensions of the boot hole 13. The boot 26 is fitted to the boot hole 13.

Working Example

Following the procedure illustrated in FIG. 6, optical-fiber-attached ferrules of this embodiment (see FIG. 4B) and optical-fiber-attached ferrules of the comparative example (see FIG. 4C) were manufactured. An environmental testing of changing the temperature of the optical-fiber-attached ferrules in the order of −40° C., 25° C., and 75° C. was conducted. Amounts of increase in loss of the optical fibers during the environmental testing were measured and the optical-fiber-attached ferrules were evaluated based on the amounts of increase in loss.

The maximum amounts of increase in loss among the amounts of increase in loss of the eight optical fibers of eight-core optical fiber ribbon were 1.0 dB in the comparative example and 0.3 dB or less in this embodiment. The amounts of increase in loss of most of the eight optical fibers of the comparative example exceeded 0.3 dB. That is, when the optical fiber with the amount of increase in loss of 0.3 dB or more was evaluated as "poor," while the almost all optical fibers of the comparative example were evaluated as "poor,", this embodiment had no optical fibers evaluated as "poor."

Second Embodiment

A ferrule 1 of a second embodiment has a reflective section 19. An optical signal is transmitted via the reflective section 19.

Figure 8:
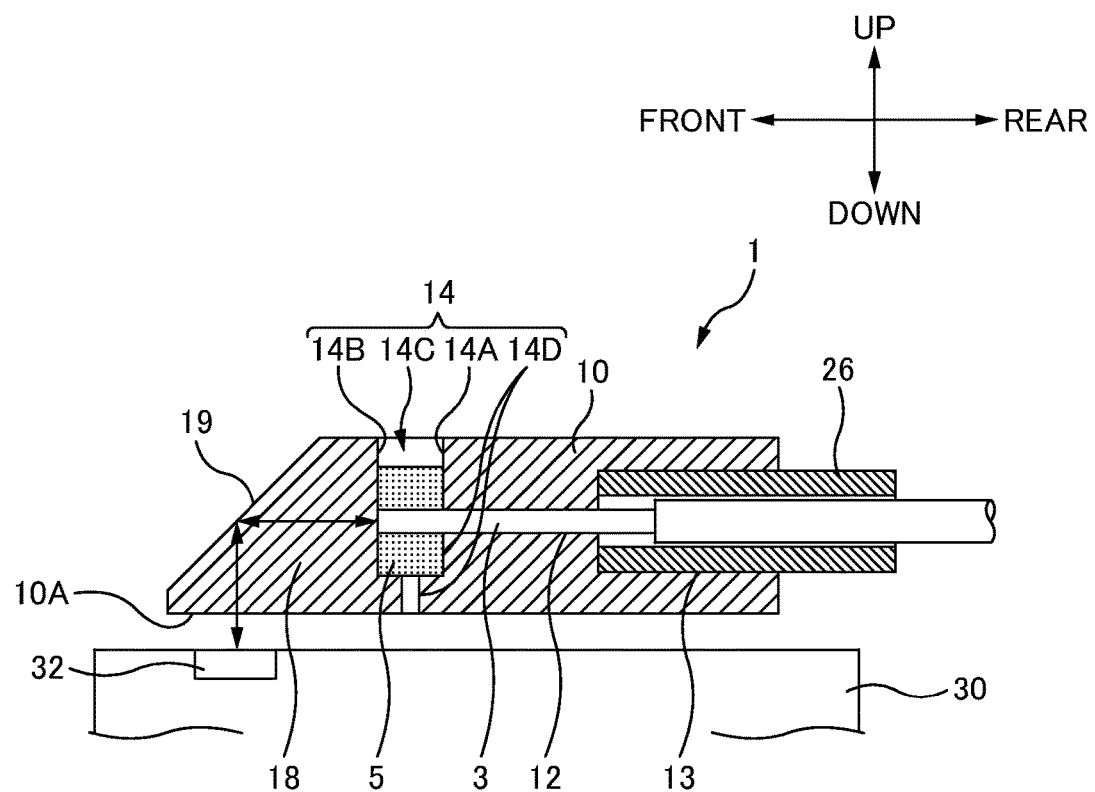
FIG. 8 is a schematic cross-sectional view of a ferrule 1 of a second embodiment.

FIG. 8 is a schematic cross-sectional view of the ferrule 1 of the second embodiment. Like reference numerals designate corresponding or identical elements to the first embodiment, and therefore such elements will not be further elaborated here.

The ferrule 1 of the second embodiment is fixed on a photoelectric conversion module 30 via a holder (not illustrated). For example, a positioning pin (not illustrated) is formed on the lower surface of the ferrule 1. The positioning pin is fitted to a positioning hole (not illustrated) of the holder (not illustrated) bonded and fixed to the top surface of the photoelectric conversion module 30. Thus, the ferrule 1 is positioned with respect to the photoelectric conversion module 30. A light-emitting element such as a semiconductor laser or a light receiving element such as a photodiode is used as a light element 32 of the photoelectric conversion module 30.

The body portion 10 of the ferrule 1 of the second embodiment is, similar to the body portion 10 of the first embodiment, integrally molded with resin, which transmits the optical signals. In the second embodiment, the lower surface of the body portion 10 is the ferrule end surface 10A. The ferrule 1 includes the plurality of optical fiber holes 12, which are arranged in the right-left direction (the direction vertical to the paper), and the adhesive-filling section 14. The adhesive-filling section 14 has the optical fiber hole opening surface 14A and the abutting surface 14B, which is opposed to the openings of the optical fiber holes 12 (the opposed surface opposed to the optical fiber hole opening surface 14A). In the body portion 10, the site to the front side with respect to the abutting surface 14B of the adhesive-filling section 14 is configured as the light transmitting part 18, and the light transmitting part 18 includes the reflective section 19. The reflective section 19 has an inclined surface inclined to the rear side the closer the section gets to the upper side.

When the light element 32 is the light-emitting element, the reflective section 19 reflects the light entering the ferrule end surface 10A to the end surfaces of the optical fibers 3 (converts the light parallel to the up-down direction into the light parallel to the front-rear direction). When the light element 32 is the light receiving element, the reflective section 19 reflects the light emitted from the end surfaces of the optical fibers 3 to the light element 32 (converts the light parallel to the front-rear direction into the light parallel to the up-down direction). Thus, the reflective section 19 reflects the light (the optical signal) to convert the optical path.

The adhesive-filling section 14 of the second embodiment also penetrates the ferrule 1 in the up-down direction and has the upper side opening 14C and the lower side opening 14D. With the second embodiment as well, the lower side opening 14D is open on the lower surface of the ferrule 1 and the bottom wall of the ferrule 1 is not disposed to the lower side opening 14D. Thus, supposing that the adhesive 5 in the adhesive-filling section 14 contracts, the contractile force by the adhesive 5 acts on both the upper portion and the lower portion of the ferrule 1. Accordingly, the second embodiment can also reduce the deformation so as to warp the ferrule 1. With the second embodiment as well, the deformation so as to warp the ferrule 1 can be reduced. Accordingly, the optical fiber end surfaces are less likely to peel off from the abutting surface 14B, ensuring reducing the transmission loss of the optical signal.

Like the lower side opening 14D of the second embodiment, formation of a stepped part on the lower side opening 14D may narrow down the opening on the lower surface in the front-rear direction. Accordingly, due to the surface tension of the adhesive 5, the adhesive 5 is less likely to leak from the lower surface. Even when the opening on the lower surface is narrowed down in the front-rear direction, since the bottom wall of the ferrule 1 is not disposed to the lower side opening 14D, the contraction of the adhesive 5 (the adhesive 5 to the lower side with respect to the optical fibers 3) filled in the lower side opening 14D allows reducing the deformation so as to warp the ferrule 1.

Third Embodiment

<Configuration>

Figure 9A:
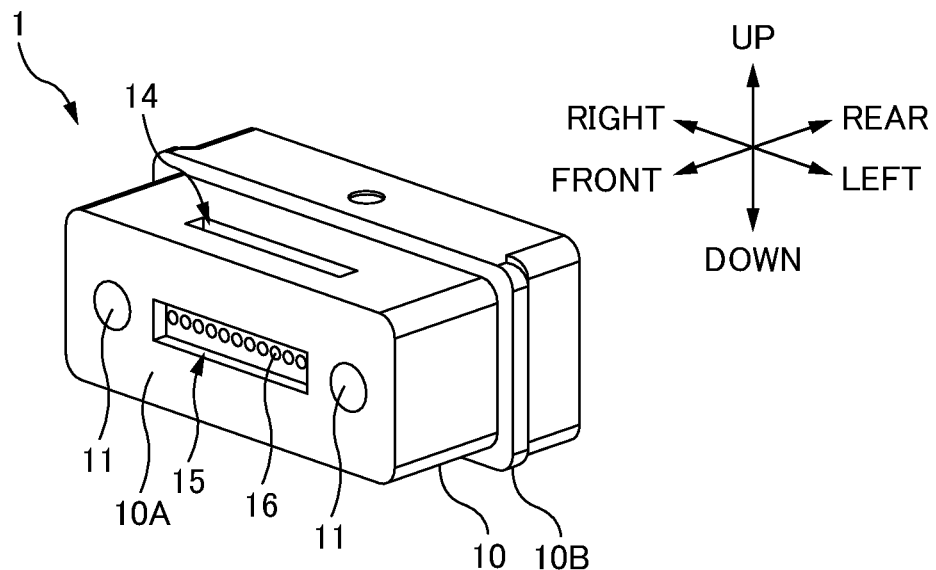
FIG. 9A and FIG. 9B are overall perspective views of a ferrule 1 of a third embodiment.
Figure 9B:
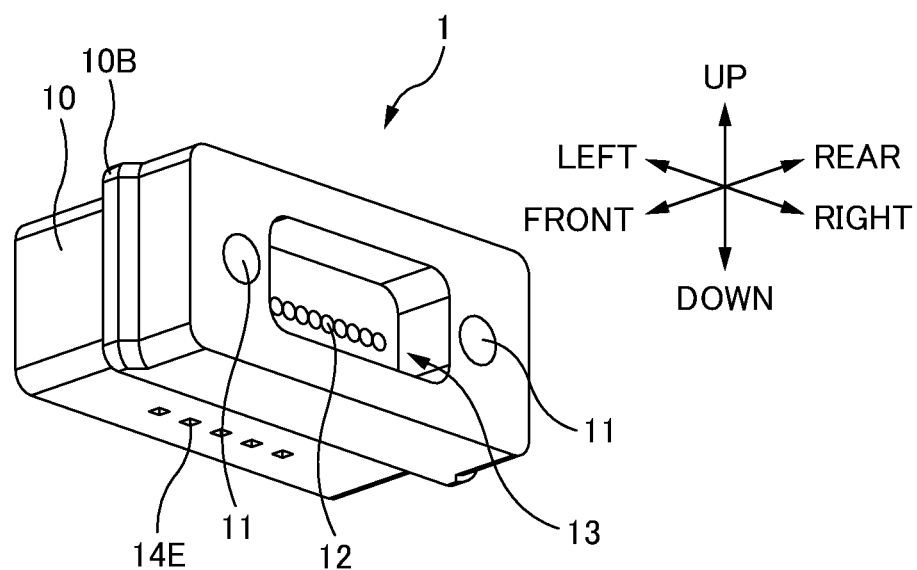
Figure 10:
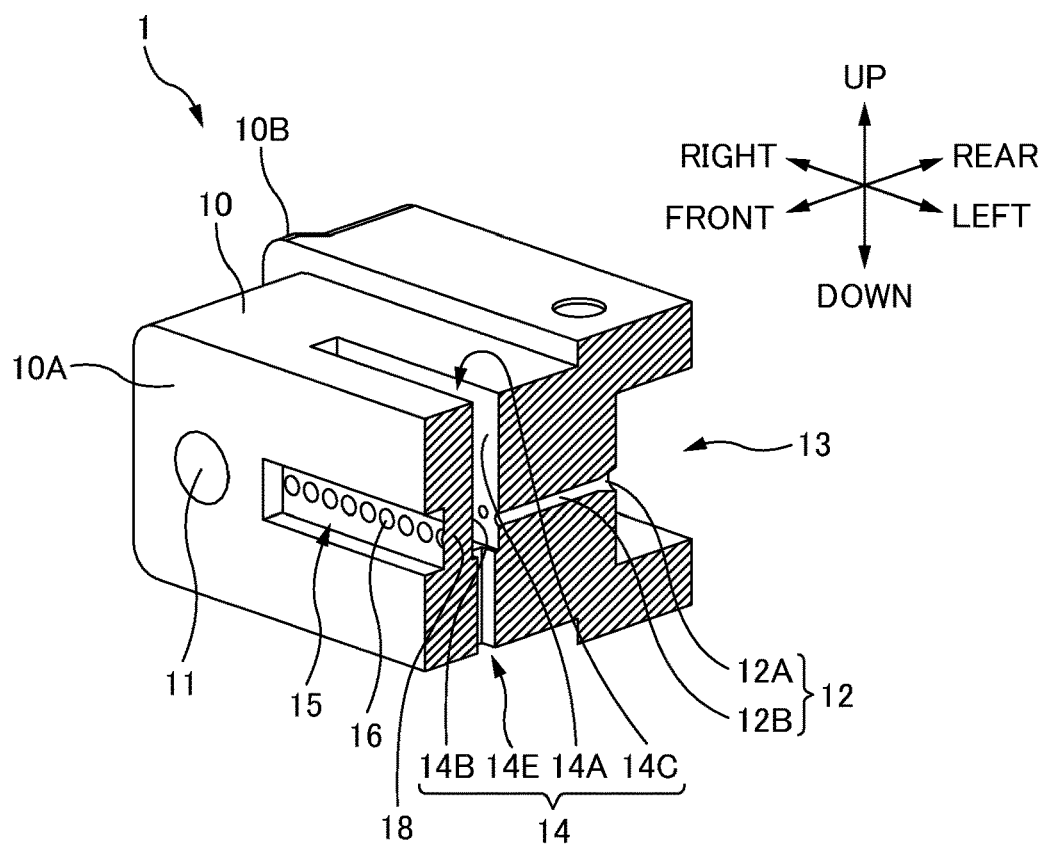
FIG. 10 is a cutaway perspective view of the ferrule 1 of the third embodiment.
Figure 11:
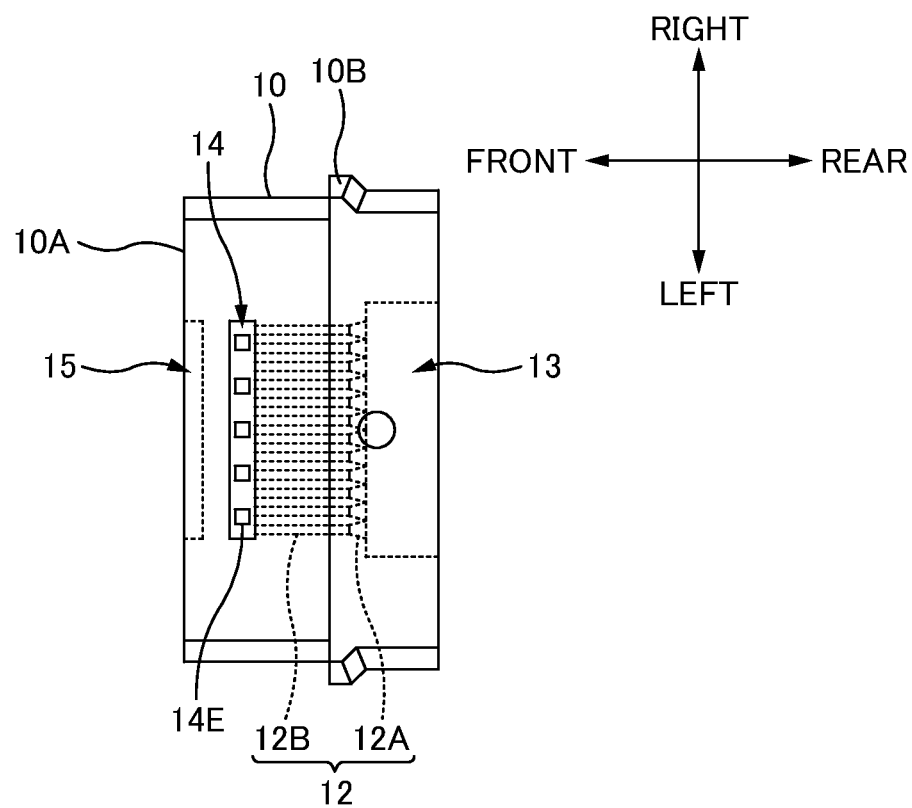
FIG. 11 is a top view of the ferrule 1 of the third embodiment.

FIG. 9A and FIG. 9B are overall perspective views of a ferrule 1 of a third embodiment. FIG. 10 is a cutaway perspective view of the ferrule 1 of the third embodiment. FIG. 11 is a top view of the ferrule 1 of the third embodiment. The schematic cross-sectional view of the optical connector to which the ferrule 1 of the third embodiment is mounted is similar to FIG. 7.

The following description defines respective directions as illustrated in the drawings. That is, the direction of an optical fiber hole 12 is defined as a "front-rear direction". That is, an optical axis direction of the optical fiber 3 (refer to FIG. 16) to be inserted into the optical fiber hole 12 is defined as the "front-rear direction." In this front-rear direction, a ferrule end surface 10A side is defined as the "front" and the other side as the "rear." That is, the side of the optical fiber end surfaces is defined as the "front."

The thickness direction of the ferrule 1 is defined as an "up-down direction" and a side of an upper opening 14C on an adhesive-filling section 14 is defined as "up" and the other side as "down."

A width direction of the ferrule 1 is defined as a "right-left direction." A direction perpendicular to the front-rear direction and the up-down direction is defined as the "right-left direction." A direction that two guide pin holes 11 are arranged is defined as the "right-left direction." A direction that the optical fiber holes 12 are arranged is defined as the "right-left direction." A direction that the plurality of optical fibers 3 constituting optical fiber ribbons are arranged is defined as the "right-left direction."

First, the following describes differences between the ferrule 1 of the third embodiment and an ordinary MT ferrule.

In the ordinary MT ferrule (JIS C5981), optical fiber end surfaces are exposed from an end surface of the ferrule. The end surfaces of the ferrules are caused to abut onto one another to physically couple the optical fiber end surfaces.

In contrast to this, the optical fiber end surfaces are not exposed from the ferrule end surface 10A of the ferrule 1 of the third embodiment. With the ferrule 1 of the third embodiment, lens sections 16 are disposed at a recess site 15 of the ferrule end surface 10A, and the optical signal enters from/is emitted from the lens sections 16. That is, the ferrule 1 of this embodiment has no physical coupling between the optical fiber end surfaces. This feature enables high durability not causing deterioration even when the attachment and removal are repeatedly performed.

The ferrule 1 is a member to hold the end portions of the optical fibers 3 (refer to FIG. 16) to transmit the optical signals. The end surface on the front side of a body portion 10 of the ferrule 1 (the ferrule end surface 10A) is a coupling end surface coupled to an optical connector on the other side. A flange part 10B, which protrudes outside from the outer peripheral surface of the body portion 10, is formed on the rear side of the body portion 10. The body portion 10 including the ferrule end surface 10A and the flange part 10B is integrally molded with a resin (for example, a transparent resin) that transmits the optical signal. The end portions of the plurality of optical fibers 3 are held at the inside of this body portion 10. The dimension of the ferrule 1 of this embodiment in the front-rear direction is 3.5 mm to 5 mm, which is shorter than the ordinary MT ferrule (about 8 mm).

The body portion 10 includes the guide pin holes 11, the optical fiber holes 12, a boot hole 13, the adhesive-filling section 14, the recess site 15, the lens sections 16, and a light transmitting part 18.

The guide pin hole 11 is a hole through which a guide pin 22 (see FIG. 7) is inserted. Inserting the guide pins 22 into the guide pin holes 11 positions the mutual optical connectors. The guide pin holes 11 penetrate the body portion 10 in the front-rear direction. On the ferrule end surface 10A, the two guide pin holes 11 are open. The two guide pin holes 11 are formed spaced in the right-left direction so as to sandwich the recess site 15 laterally.

The optical fiber holes 12 are holes through which the optical fibers 3 are inserted. The optical fiber hole 12 is a hole to position the optical fiber 3. The optical fiber holes 12 penetrate between the boot hole 13 and the adhesive-filling section 14. A bare fiber formed by removing a coating from an optical fiber is inserted into the optical fiber hole 12. The plurality of optical fiber holes 12 are arranged in the right-left direction, each of which is parallel in the front-rear direction. That is, the plurality of optical fiber holes 12 parallel to one another are arranged in the right-left direction. The optical fiber holes 12 each include a tapered part 12A and a fiber fixing part 12B.

The tapered part 12A is disposed at the rear end part of the optical fiber hole 12 and has a tapered shape expanding to the rear side. Disposing such tapered part 12A facilities inserting the optical fiber 3 into the optical fiber hole 12.

The fiber fixing part 12B is disposed on the front side with respect to the tapered part 12A and has a size (a diameter) approximately identical to the diameter of the optical fiber 3. This ensures fixing (positioning) the optical fiber inserted into the optical fiber hole 12. In this embodiment, to accurately fix the optical fiber 3, the dimension of the fiber fixing part 12B in the front-rear direction is set to about 1.2 mm.

The boot hole 13 is disposed on the end surface on the rear side of the ferrule 1. The boot hole 13 is a hole to house and fix a boot 26 (see FIG. 7) mounted to the optical fibers 3.

The adhesive-filling section 14 is a hollow portion having the upper opening 14C (equivalent to an opening) from which the adhesive 5 (refer to FIG. 16) is filled. The adhesive-filling section 14 has an optical fiber hole opening surface 14A (equivalent to an opening surface), an abutting surface 14B (equivalent to an opposed surface), and ventilation holes 14E.

The upper opening 14C is formed to have a rectangular shape elongated in the right-left direction on the top surface of the body portion 10 of the ferrule 1. That is, the adhesive-filling section 14 forms the hollow that is long in the right-left direction (longer than a length that the plurality of optical fiber holes 12 and lens sections 16 are arranged in the right-left direction). The bottom of the hollow is positioned lower than the optical fiber holes 12 and the lens sections 16. The adhesive 5 is filled from this upper opening 14C into the hollow (the adhesive-filling section 14).

The optical fiber hole opening surface 14A is the inner wall on the rear side of the adhesive-filling section 14. On this optical fiber hole opening surface 14A, the plurality of optical fiber holes 12 are open and arranged in the right-left direction.

The abutting surface 14B (equivalent to the opposed surface) is the inner wall on the front side of the adhesive-filling section 14 and is opposed to the optical fiber hole opening surface 14A. The abutting surface 14B is a surface on the side onto which the end surfaces of the optical fibers 3 are caused to abut.

The details of the ventilation holes 14E will be described later.

The recess site 15 is a site recessed to the ferrule end surface 10A. The recess site 15 is disposed between the two guide pin holes 11 on the ferrule end surface 10A. The recess site 15 is formed into a rectangular shape elongated in the right-left direction so as to correspond to the plurality of optical fiber holes 12.

The lens sections 16 are disposed on the bottom surface (the surface on the rear side) of the recess site 15. The lens sections 16 are disposed corresponding to the plurality of respective optical fibers 3 (in other words, the plurality of optical fiber holes 12). The optical signal is input to and output from the optical fibers 3 via the lens sections 16.

The light transmitting part 18 is a site (a site forming an optical path) that transmits the optical signals between the ferrule end surface 10A (more specifically, the lens sections 16 at the recess site 15 of the ferrule end surface 10A) and the abutting surface 14B of the adhesive-filling section 14. The body portion 10 of this embodiment is integrally molded with the resin that transmits the optical signals.

Meanwhile, it is only necessary that at least the site where the optical path is formed can transmit the optical signals, and a site other than this site may be made of another material (a material not transmitting the optical signals).

With the ferrule 1 of this embodiment, the dimension of the adhesive-filling section 14 in the front-rear direction (a gap between the optical fiber hole opening surface 14A and the abutting surface 14B) is short. The following describes this reason.

As described above, the dimension of the ferrule 1 of this embodiment in the front-rear direction is 3.5 to 5 mm, which is shorter than the dimension of the ordinary MT ferrule in the front-rear direction (about 8 mm). Note that, to accurately fix the optical fiber 3, a certain amount of length (here, 1.2 mm) needs to be secured for the dimension of the fiber fixing part 12B in the front-rear direction. In addition, since the ferrule end surface 10A includes the recess site 15, the lens sections 16, and the light transmitting part 18, dimensions for these members also need to be secured. This shortens the dimension (the gap) of the adhesive-filling section 14 in the front-rear direction.

The excessively long dimension (gap) of the adhesive-filling section 14 in the front-rear direction possibly bends the end portions of the optical fibers 3 when the optical fibers 3 are caused to abut onto the abutting surface 14B of the adhesive-filling section 14. For this reason as well, the dimension (the gap) of the adhesive-filling section 14 in the front-rear direction is shortened.

Because of such reasons, this embodiment shortens the dimension of the adhesive-filling section 14 in the front-rear direction (specifically, 0.5 mm or less). However, with the dimension of the adhesive-filling section 14 in the front-rear direction narrower than 0.35 mm, filling the adhesive-filling section 14 with the adhesive 5 becomes difficult. In view of this, this embodiment sets the dimension of the adhesive-filling section 14 in the front-rear direction to 0.35 mm to 0.50 mm.

Even when the dimension of the ferrule 1 in the front-rear direction is longer than this embodiment, the dimension (the gap) of the adhesive-filling section 14 in the front-rear direction becomes short in some cases.

As illustrated in FIG. 7, the ferrule 1 of this embodiment can be housed in a housing 20 of an optical connector device for use.

The housing 20 is a member that houses the ferrule 1 to be retreatable. A protruding part is formed at an internal space of the housing 20. With this protruding part engaged with the flange part 10B of the ferrule 1, the ferrule 1 is biased to the front side by a repulsion force from a spring 24.

The guide pins 22 are inserted into the two guide pin holes 11 of the ferrule 1. These guide pins 22 position the ferrule 1 with respect to the ferrule on the other side. The boot 26 is inserted into the boot hole 13 on the ferrule 1. A cross-sectional surface of the boot 26 has an approximately tubular rectangular shape. The plurality of respective optical fibers 3 penetrate the boot 26 in the front-rear direction. Although the boot 26 is preferably configured of a flexible material such as a rubber and an elastomer, the boot 26 may be configured of a low-flexible material such as a resin and a metal. The dimensions of the boot 26 in the right-left direction and the up-down direction are approximately identical to the dimensions of the boot hole 13. The boot 26 is fitted to the boot hole 13. The use of such boot 26 ensures reducing a bending and damage of the optical fiber 3.

<Ventilation Hole 14E>

Figure 16A:
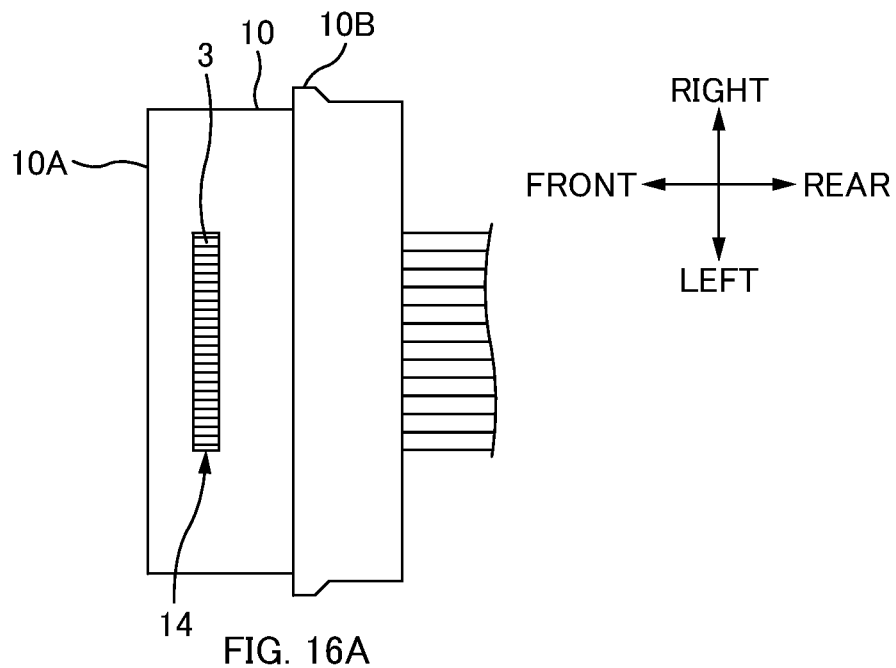
FIG. 16A to FIG. 16C are explanatory diagrams of a comparative example.
Figure 16B:
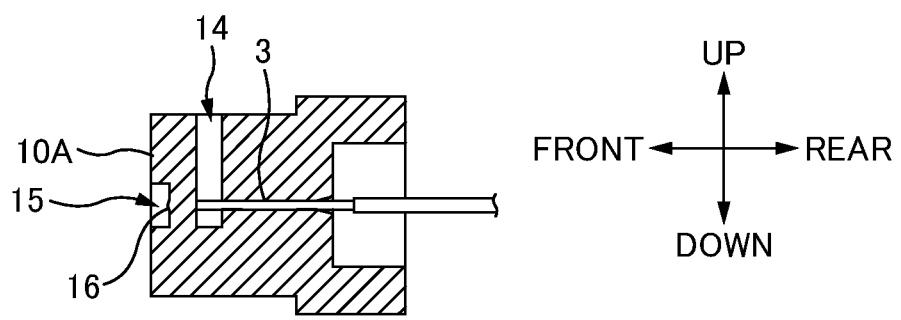
Figure 16C:
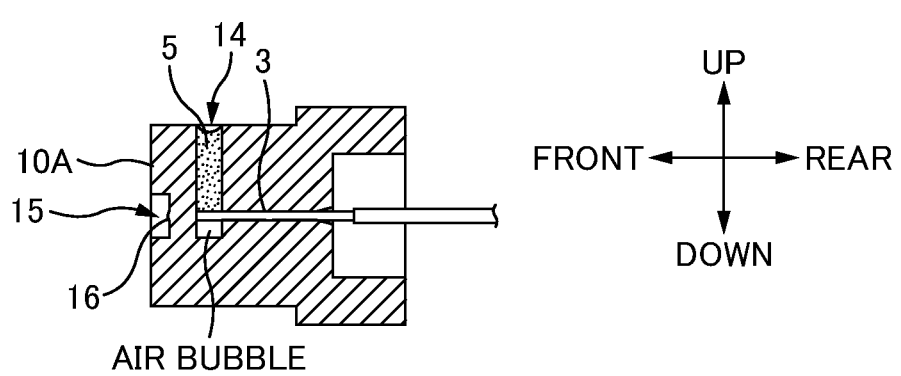

FIG. 16A to FIG. 16C are explanatory diagrams of a comparative example. FIG. 16A illustrates a top view, and FIG. 16B illustrates a cross-sectional side view. FIG. 16C is a cross-sectional side view illustrating a state of filling of the adhesive 5 in the comparative example. With the comparative example, the ventilation holes 14E are not formed on the adhesive-filling section 14.

As illustrated in FIG. 16B and FIG. 16C, with the end surfaces of the optical fibers (the optical fiber end surfaces) 3 caused to abut onto the abutting surface 14B of the adhesive-filling section 14, the adhesive-filling section 14 is to be filled with the adhesive 5 (for example, an epoxy-based adhesive).

When the adhesive 5 has high viscosity, it is difficult for the adhesive 5 to reach the lower sides of the optical fibers 3 in the adhesive-filling section 14, and as illustrated in FIG. 16C, the air bubble is likely to be formed to the lower sides of the optical fibers 3 (the air is likely to remain). The presence of the air bubble on the lower sides of the optical fibers 3 is likely to form the air layer (the air bubble) on the optical fiber end surfaces, increasing the signal loss of the optical signal.

Especially, in the case where the plurality of optical fibers 3 are arranged side by side as illustrated in FIG. 16A, the plurality of optical fibers 3 become the barrier. Thus, the adhesive 5 is likely to accumulate on the upper portions of the plurality of optical fibers 3. The adhesive 5 accumulated on the upper portions of the plurality of optical fibers 3 blocks the adhesive-filling section 14. In the case where the adhesive-filling section 14 is once blocked by the adhesive 5 on the upper portions of the optical fibers 3, it is difficult for the adhesive 5 to reach the lower side of the adhesive-filling section 14. This is likely to form air bubbles. Even when the adhesive-filling section 14 is once blocked with the adhesive 5 on the upper portions of the optical fibers 3, the air bubble may possibly come out to the upper sides after a sufficient time elapses. However, this comparative example takes the time until the air bubble comes out, resulting in poor work efficiency.

Therefore, as illustrated in FIG. 9 to FIG. 11, this embodiment has the ventilation holes 14E on the adhesive-filling section 14.

The ventilation holes 14E have a function to cause the air inside the adhesive-filling section 14 to escape to the outside of the ferrule 1. The ventilation holes 14E are through-holes formed between the inside of the adhesive-filling section 14 and the outside of the ferrule 1. While the ventilation holes 14E of this embodiment have a rectangular cross-sectional shape, the shape is not limited to this. For example, the shape may be a circular cross-sectional surface or may be a slit shape. A size of the ventilation hole 14 is preferably such that air is passable but the adhesive 5 does not pass through due to the surface tension of the adhesive 5. One hole may double as the ventilation hole 14E and the above-described lower side opening 14D, or the above-described lower side opening 14D may be configured separately from the ventilation holes 14E.

The ventilation holes 14E have inlets on the bottom surface of the adhesive-filling section 14 (equivalent to the openings on the adhesive-filling section side) and outlets on the lower surface of the ferrule 1 (equivalent to the openings on the side outside the ferrule). That is, the ventilation holes 14E are positioned on the lower side with respect to the optical fiber holes 12 (the optical fibers 3) to let the air escape to the lower sides of the optical fibers 3 to the outside (see FIG. 16B and FIG. 16C).

The plurality (here, five) of the ventilation holes 14E are disposed. However, this should not be constructed in a limiting sense and the number of ventilation holes 14E may be one.

The plurality of ventilation holes 14E are arranged in the right-left direction. Disposing at least the two ventilation holes 14E on both right and left ends is preferable. This is because, for example, the way of putting the adhesive 5 into the adhesive-filling section 14 (such as entering the adhesive 5 from the center and from the end) differs depending on the operator; therefore, this configuration is made such that the air bubble is emittable regardless of the way of putting in the adhesive 5.

<Assembly Procedure>

The assembly procedure (the manufacturing method) of the optical-fiber-attached ferrule of this embodiment is similar to the flowchart shown in FIG. 6.

First, the ferrule 1 (the body portion 10) is prepared (S101). Then, the ferrule 1 is set to a tool (not illustrated). This tool is configured so as not to block the ventilation holes 14E on the lower surface of the ferrule 1. This configuration is made for ventilation by the ventilation holes 14. Because, in the case where the openings of the ventilation holes 14E are blocked with the tool to the extent that the ventilation is possible, when the adhesive 5 flows through the ventilation holes 14E, the capillarity possibly spreads the adhesive 5 to the lower surface of the ferrule 1.

Next, the respective optical fibers 3 of the optical fiber ribbon are inserted into the respective optical fiber holes 12 of the ferrule 1 (S102). Then, the optical fiber end surfaces are protruded from the optical fiber hole opening surface 14A. Note that, here, the optical fiber end surfaces have not yet abutted onto the abutting surface 14B of the adhesive-filling section 14.

After that, air cleaning is performed on the inside of the adhesive-filling section 14 to clean the optical fiber end surfaces (S103). Thus, the dust or the like attached to the optical fiber end surface when the optical fiber 3 is passed through the optical fiber hole 12 is removed. To thus remove the dust, the adhesive 5 is filled after the insertion of the optical fibers 3.

After the air cleaning, the optical fiber end surfaces of the optical fibers 3 protruding from the optical fiber hole opening surface 14A are caused to abut onto the abutting surface 14B of the adhesive-filling section 14 (S104). At this time, as illustrated in FIG. 16A, causing the plurality of optical fibers 3 to abut onto the abutting surface 14B arranges the plurality of optical fibers 3 in the right-left direction like a wall inside the adhesive-filling section 14.

Afterwards, the adhesive 5 is filled from the upper opening 14C into the adhesive-filling section 14 to fix the optical fibers 3 (S105). With this embodiment, since the air to the lower sides of the optical fibers 3 are emitted outside through the ventilation holes 14E, the air bubble is less likely to be formed to the lower sides of the optical fibers 3. Accordingly, the air layer is less likely to be produced on the optical fiber end surfaces, thereby ensuring reducing the signal loss of the optical signal. With this embodiment, since the ventilation holes 14E promote the air bubbles to the lower sides of the optical fibers 3 to come out, the time until the air bubbles come out is also shortened (the work efficiency can be improved).

Working Example

The ferrule 1 without the ventilation hole 14E (the comparative example) was compared with the ferrule 1 with the ventilation holes 14E (this embodiment) in working times for the filling of adhesive.

While the working time of the case without the ventilation hole 14E (the comparative example) was one minute, the working time of the case with the ventilation holes 14E (this embodiment) was 10 to 20 seconds. It has been confirmed that thus disposing the ventilation holes 14E can shorten the working time for the filling of adhesive.

<Modifications>

Figure 12:
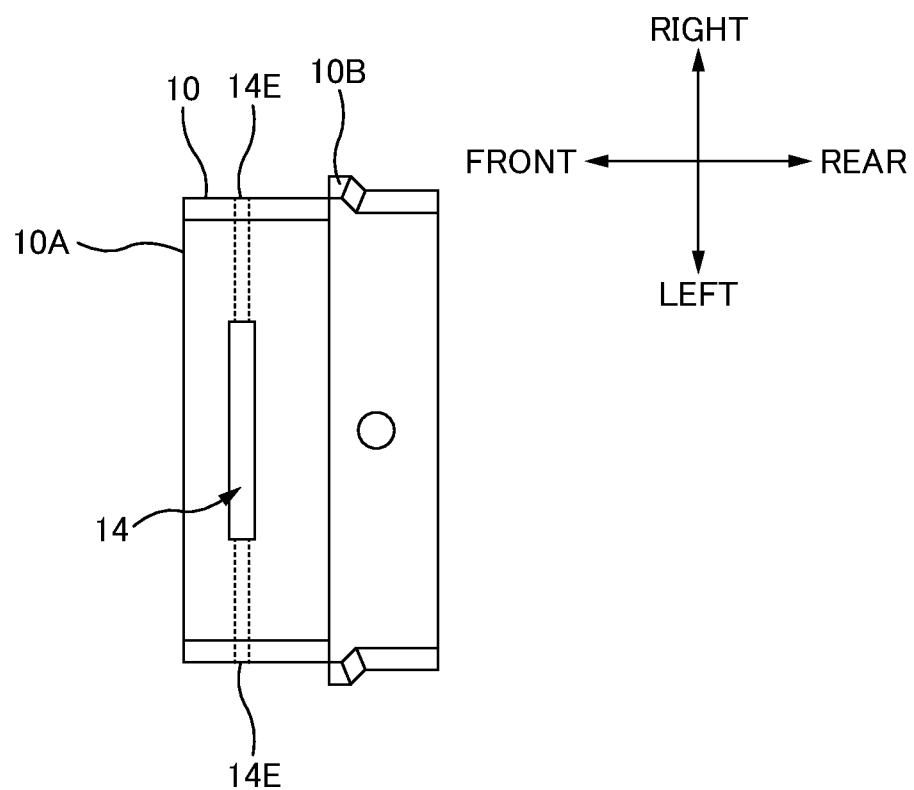
FIG. 12 is an explanatory diagram of a first modification of the third embodiment.

FIG. 12 is an explanatory diagram of a first modification of the third embodiment.

The direction of the ventilation hole 14E is not limited to the up-down direction. The position of the inlet of the ventilation hole 14 is not limited to the bottom surface of the adhesive-filling section 14.

For example, as illustrated in FIG. 12, the ventilation hole 14E may be formed laterally (the right-left direction) from the side surface of the adhesive-filling section 14. The inlet of the ventilation hole 14E is preferably formed on the lower side with respect to the optical fibers 3 (in other words, the optical fiber holes 12 and the lens sections 16) (see FIG. 14). In further detail, the inlet of the ventilation hole 14E is preferably close to the bottom surface of the adhesive-filling section 14 with respect to the optical fibers 3. This facilitates emitting the air inside the adhesive-filling section 14. The same applies to the following modifications.

Figure 13:
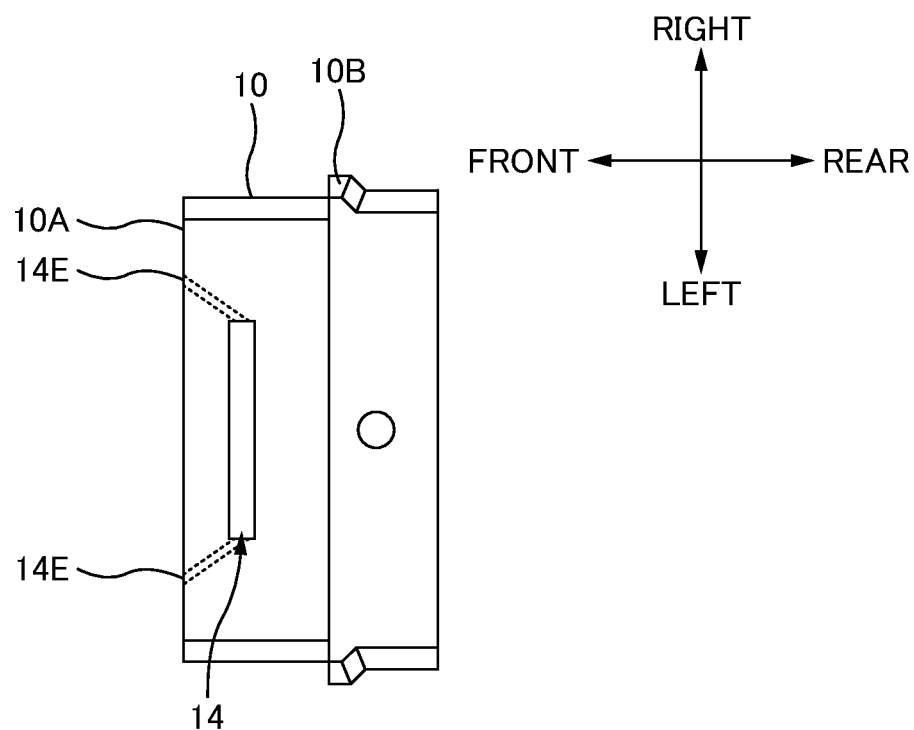
FIG. 13 is an explanatory diagram of a second modification of the third embodiment.

FIG. 13 is an explanatory diagram of a second modification of the third embodiment.

An outlet of the ventilation hole 14E may be the front (or the rear) with respect to the adhesive-filling section 14.

For example, as illustrated in FIG. 13, the outlets of the ventilation holes 14 may be formed on the ferrule end surface 10A.

Figure 14:
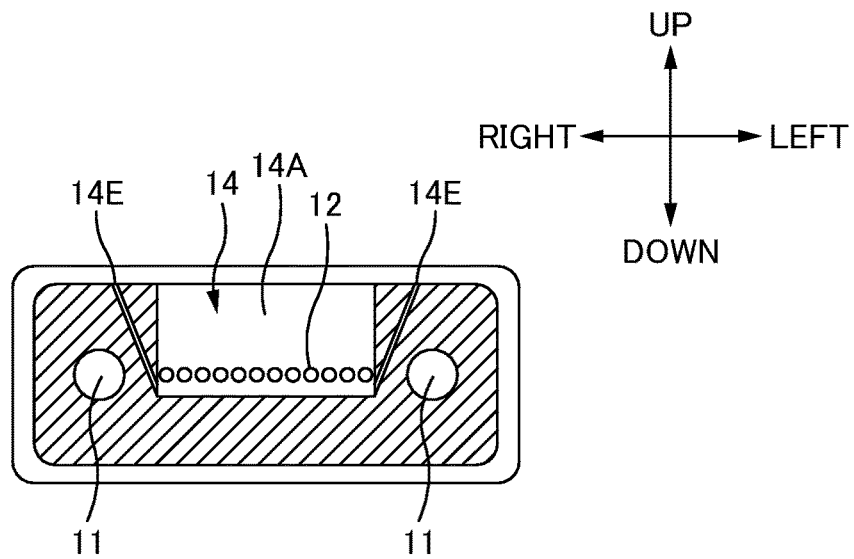
FIG. 14 is an explanatory diagram of a third modification of the third embodiment.

FIG. 14 is an explanatory diagram of a third modification of the third embodiment. FIG. 14 is a cross-sectional view of the adhesive-filling section 14.

It is only necessary that the openings (the inlets) of the ventilation holes 14E on the adhesive-filling section 14 side are disposed to the lower side with respect to the optical fiber holes 12 (the optical fibers 3). For example, as illustrated in FIG. 14, the outlets of the ventilation holes 14 may be formed on the top surface (the upper opening 14C side) of the ferrule 1. Thus, by forming the outlets of the ventilation holes 14E upward with respect to the inlets, the adhesive 5 is less likely to flow out from the ventilation holes 14E to the outside.

As described above, the ferrule 1 of this embodiment has the ferrule end surface 10A, the plurality of optical fiber holes 12, which are disposed for insertion of the respective optical fibers 3, and the adhesive-filling section 14 on which the upper opening 14C from which the adhesive 5 is to be filled is disposed. The adhesive-filling section 14 internally has the optical fiber hole opening surface 14A and the abutting surface 14B opposed to the optical fiber hole opening surface 14A. Further, the ferrule 1 includes the ventilation holes 14E, which are formed between the inside of the adhesive-filling section 14 and the outside of the ferrule 1.

Thus disposing the ventilation holes 14E can prevent the air from remaining inside the adhesive-filling section 14.

Fourth Embodiment

A ferrule of the fourth embodiment includes a reflective section. The optical signal is transmitted via the reflective section.

Figure 15:
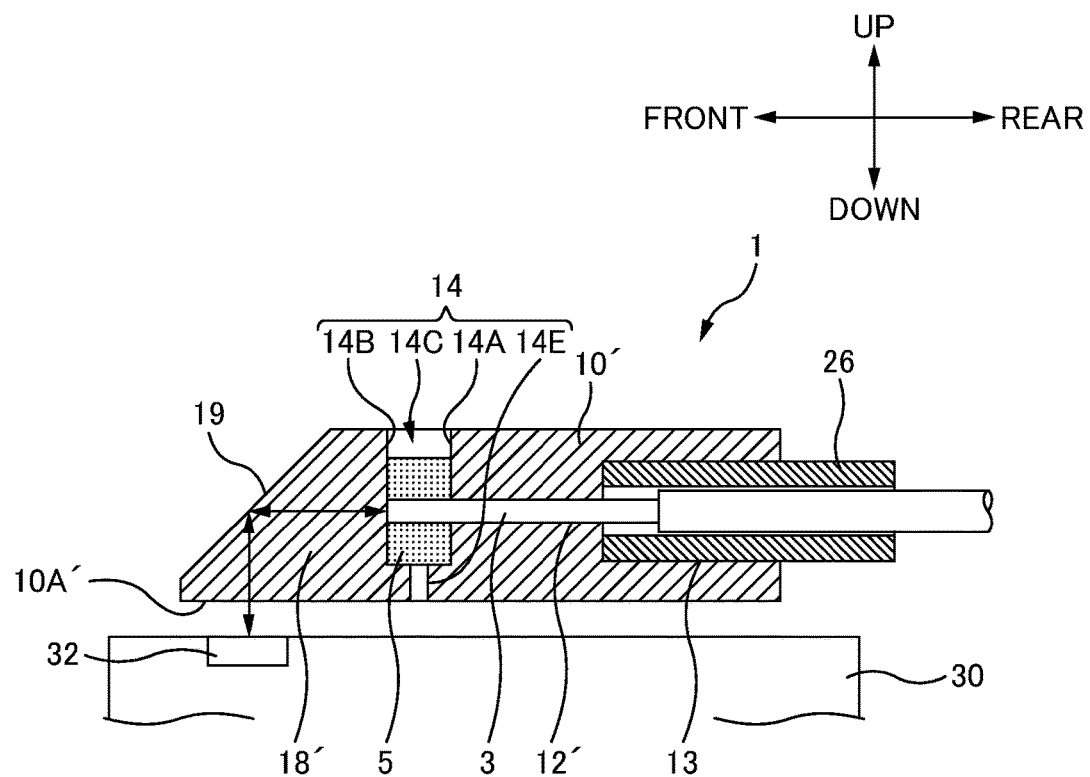
FIG. 15 is a schematic cross-sectional view of a ferrule 1 of a fourth embodiment.

FIG. 15 is a schematic cross-sectional view of a ferrule 1 of the fourth embodiment. Like reference numerals designate corresponding or identical elements of the third embodiment, and therefore description of such elements will be omitted here.

The ferrule 1 of the fourth embodiment is fixed on a photoelectric conversion module 30 that includes or incorporates a light element 32 by, for example, a holder (not illustrated). The light element 32 is a light-emitting element such as a semiconductor laser or a light receiving element such as a photodiode.

A body portion 10' of the ferrule 1 of the fourth embodiment is, similar to the body portion 10 of the third embodiment, integrally molded with the resin, which transmits the optical signals. However, the body portion 10' does not include a flange part and a recess. In the fourth embodiment, the lower surface of the body portion 10' is a ferrule end surface 10A'. In the body portion 10', the site on the front side with respect to the abutting surface 14B of the adhesive-filling section 14 is configured as a light transmitting part 18', and the light transmitting part 18' includes a reflective section 19. The reflective section 19 has an inclined surface approaching the adhesive-filling section 14 as heading from the lower surface (the ferrule end surface 10A') side to the top surface side.

When the light element 32 is the light-emitting element, the reflective section 19 reflects the light entering the ferrule end surface 10A' to the end surfaces of the optical fibers 3. With the light element 32 being the light receiving element, the light emitted from the end surfaces of the optical fibers 3 are reflected to the light element 32. Thus, the reflective section 19 reflects the light (the optical signal) to convert the optical path.

The inlet of the ventilation hole 14E is formed on the bottom surface of the adhesive-filling section 14, and the outlet is formed on the ferrule end surface 10A (the lower surface). The ventilation hole 14E may be formed in a location similar to the modifications of the third embodiment (FIG. 12 to FIG. 14).

In this fourth embodiment as well, thus disposing the ventilation hole 14E can prevent the air from remaining inside the adhesive-filling section 14.

Others

The above-described embodiments are intended for easy understanding of the present invention and are not in any way to be construed as limiting the present invention. Needless to say, the present invention may be modified and improved without departing from the gist of the invention, and equivalents thereof are also encompassed by the invention.

REFERENCE SIGNS LIST 1 ferrule, 3 optical fiber,
4 optical fiber ribbon, 5 adhesive,
10 body portion, 10' body portion,
10A ferrule end surface, 10B flange part,
11 guide pin hole, 12 optical fiber hole, 12' optical fiber hole,
12A tapered part, 12B fiber fixing part,
13 boot hole, 14 adhesive-filling section,
14A optical fiber hole opening surface, 14B abutting surface,
14C upper side opening, 14D lower side opening, 14E ventilation hole,
15 recess site, 16 lens section,
18 light transmitting part, 19 reflective section,
20 housing, 20A protruding part,
22 guide pin,
24 spring, 26 boot,
30 photoelectric conversion module, 32 light element

The invention claimed is:

1. A ferrule that holds end portions of optical fibers, the ferrule comprising:
a plurality of optical fiber holes arranged in a predetermined direction, wherein the optical fibers are inserted into the plurality of optical fiber holes; and
an adhesive-filling section that is filled with an adhesive and internally includes an opening surface of the plurality of optical fiber holes and an opposed surface opposed to the opening surface, wherein
the adhesive-filling section includes an upper side opening and a lower side opening,
the upper side opening opens on a top surface that is a surface on a side from which the adhesive is filled, and
the lower side opening opens on a lower surface that is a surface on a side opposite to the top surface,
wherein an entirety of the ferrule is integrally-molded.

2. The ferrule according to claim 1, wherein:
the upper side opening has a length W0 in the predetermined direction wider than a length W1, the length W1 being a length of a row of a plurality of the optical fiber holes in the predetermined direction, and
the lower side opening has a length W in the predetermined direction wider than a half of the length W0 of the upper side opening.

3. The ferrule according to claim 2, wherein
the lower side opening has the length W wider than the length W1 of the row of the plurality of the optical fiber holes.

4. The ferrule according to claim 1, wherein
a size of the lower side opening is such that the adhesive does not pass through due to surface tension of the adhesive.

5. The ferrule according to claim 1, wherein
the upper side opening is formed into a tapered shape expanding to an upper side.

6. The ferrule according to claim 1, wherein
the adhesive-filling section includes a ventilation hole that allows the adhesive-filling section to communicate with an outside of the ferrule.

7. The ferrule according to claim 6, wherein
an opening of the ventilation hole to the adhesive-filling section side is closer to a bottom surface of the adhesive-filling section than the optical fiber holes.

8. The ferrule according to claim 6, wherein
an opening of the ventilation hole to a side outside the ferrule is formed on a side opposite to the opening from which the adhesive is filled.

9. The ferrule according to claim 8, wherein
a size of the ventilation hole is such that the adhesive does not pass through due to surface tension of the adhesive.

10. The ferrule according to claim 6, wherein
an opening of the ventilation hole to a side outside the ferrule is formed on a side of the opening from which the adhesive is filled.

11. The ferrule according to claim 1, further comprising:
a recess site recessed with respect to an end surface of the ferrule; and
lens sections formed on the recess site and disposed corresponding to the respective optical fiber holes.

12. The ferrule according to claim 1, further comprising
a light transmitting part that transmits an optical signal between the end surface of the ferrule and the opposed surface, wherein the light transmitting part includes a reflective section that reflects the optical signal to convert an optical path.

13. The ferrule according to claim 1, wherein
insertion of a plurality of the optical fibers into the respective optical fiber holes aligns the optical fibers protruding from the opening surface inside the adhesive-filling section.

14. A method of manufacturing an optical-fiber-attached ferrule comprising:
(1) preparing a ferrule that includes:
   a plurality of optical fiber holes arranged in a predetermined direction, and
   an adhesive-filling section that is filled with an adhesive and internally includes an opening surface of the plurality of optical fiber holes and an opposed surface opposed to the opening surface, wherein the adhesive-filling section comprises an upper side opening and a lower side opening, the upper side opening opens on a top surface that is a surface on a side from which the adhesive is filled, and the lower side opening opens on a lower surface that is a surface on a side opposite to the top surface;
(2) inserting the optical fibers into the optical fiber holes and causing end surfaces of the optical fibers protruding from the opening surface to abut onto the opposed surface; and
(3) filling the adhesive between the end surfaces of the optical fibers and the opposed surface by filling the adhesive in the adhesive-filling section,
wherein an entirety of the ferrule is integrally-molded.

15. The method of manufacturing the optical-fiber-attached ferrule according to claim 14, wherein
the adhesive fills between the end surfaces of the optical fibers and the opposed surface by the filling of the adhesive from the upper side opening.

16. A ferrule that holds end portions of optical fibers, the ferrule being integrally molded with resin and comprising:
the optical fibers;
an insert hole where a bundle of optical fibers is inserted;
a plurality of optical fiber holes, wherein the optical fibers are individually inserted into the plurality of optical fiber holes;
an adhesive-filling section internally including an opening surface provided with openings of the plurality of optical fiber holes and internally including an opposed surface opposed to the opening surface, the adhesive-filling section is filled with an adhesive having a refractive-index matching function;
an upper side opening that opens on a top surface positioned on a side where the adhesive is filled;
a lower side opening that opens on a lower surface positioned on a side opposite to the top surface;
a plurality of lens sections disposed individually corresponding to the plurality of optical fiber holes;
wherein the optical fibers are individually inserted into the plurality of the optical fiber holes via the insert hole, each of the end portions protruding from the opening surface of the adhesive-filling section and abutting against the opposed surface,
wherein the adhesive is filled between each of the end portions and the opposed surface so that the end portions and the opposed surface adhere to each other,
wherein a maximum amount of increase in loss among the optical fibers is 0.3 dB or less in an environmental testing where the temperature of the optical-fiber-attached ferrules is changed in the order of 40° C., 25° C., and 75° C., and
wherein an entirety of the ferrule is integrally-molded.

* * * * *

UNITED STATES PATENT AND TRADEMARK OFFICE
CERTIFICATE OF CORRECTION

PATENT NO. : 10,222,559 B2
APPLICATION NO. : 15/560852
DATED : March 5, 2019
INVENTOR(S) : Akihiro Nakama et al.

Page 1 of 1

It is certified that error appears in the above-identified patent and that said Letters Patent is hereby corrected as shown below:

In the Claims

At Column 22, Claim number 16, Line number 31, the word "40° C." should read -- –40° C. --.

Signed and Sealed this
Twelfth Day of November, 2019

Andrei Iancu
*Director of the United States Patent and Trademark Office*